US006927758B1

(12) United States Patent
Piot et al.

(10) Patent No.: US 6,927,758 B1
(45) Date of Patent: Aug. 9, 2005

(54) OPTICAL DETECTION SYSTEM, DEVICE, AND METHOD UTILIZING OPTICAL MATCHING

(75) Inventors: Julien Piot, Rolle (CH); Urban G. Schnell, Colombier (CH); Philippe J. Nussbaum, Hegenheim (CH)

(73) Assignee: Logitech Europe S.A. (CH)

( * ) Notice: Subject to any disclaimer, the term of this patent is extended or adjusted under 35 U.S.C. 154(b) by 404 days.

(21) Appl. No.: 09/895,749

(22) Filed: Jun. 29, 2001

Related U.S. Application Data

(63) Continuation of application No. 08/869,471, filed on Jun. 5, 1997, now Pat. No. 6,256,016.

(51) Int. Cl.[7] .............................................. G09G 5/08
(52) U.S. Cl. ...................... 345/166; 345/163; 345/158
(58) Field of Search .......................... 345/158, 163–167; 250/208.1, 234, 235, 221, 208.5, 214.1, 215; 356/375, 376

(56) References Cited

U.S. PATENT DOCUMENTS

| 4,521,772 A | 6/1985 | Lyon |
| 4,521,773 A | 6/1985 | Lyon |
| 4,794,384 A | * 12/1988 | Jackson ....................... 345/166 |
| 4,799,055 A | 1/1989 | Nestler et al. |

(Continued)

FOREIGN PATENT DOCUMENTS

| EP | 1081634 A2 | 3/2001 |
| EP | 1182606 A2 | 2/2002 |
| EP | 1283493 A2 | 2/2003 |
| GB | 2 272 763 A | 5/1994 |
| WO | WO 99/39304 | 8/1999 |
| WO | WO 00/33245 | 6/2000 |
| WO | WO 00/38103 | 6/2000 |
| WO | WO 00/57352 | 9/2000 |

OTHER PUBLICATIONS

"Agilent ADNS–2030 Optical Mouse Sensor, Product Overview," Agilent Technologies, Mar. 10, 2003, pp. 1–4.

(Continued)

Primary Examiner—Regina Liang
Assistant Examiner—Jennifer T. Nguyen
(74) Attorney, Agent, or Firm—Fenwick & West LLP

(57) ABSTRACT

An optical detection system and method detects movement of an optical pointing device in a data processing environment. The system works with any surface than can diffusely scatter a collimated beam from a coherent light source. Specifically, the system comprises a coherent light source and an optical sensing assembly. The optical sensing assembly comprises a plurality of photosensor arrays and a plurality of optical elements. Each photosensor array includes pixels of a particular size and shape. Each optical element has an artificially limited aperture and is associated, through optical matching, with a respective photosensor array. The coherent light source generates a collimated beam that is diffusely reflected off of the surface. The optical sensing assembly receives the diffusely reflected, or scattered, collimated beam and passes it through the artificially limited apertures of the optical elements to the associated corresponding photosensor array. Passing the scattered light through the optical elements generates speckle images that appear on the pixels, of the photosensor arrays. Based on the pixel shape, a pixel value associated with the speckle image provides a speckle image data signal. When there is translation of the pointing device, a new set of speckle images, each reassembling to a translated version of the previous speckle image, are generated and another speckle image data signal is generated. The new and the previous speckle image data signals are then used in a motion detection analysis to determine the points of the two data signals that give a displacement value.

114 Claims, 17 Drawing Sheets

U.S. PATENT DOCUMENTS

| | | | |
|---|---|---|---|
| 5,056,080 A | * 10/1991 | Russell | 369/100 |
| 5,420,943 A | 5/1995 | Mak | |
| 5,578,813 A | 11/1996 | Allen et al. | 250/208 |
| 5,578,817 A | 11/1996 | Bidiville et al. | |
| 5,644,139 A | 7/1997 | Allen et al. | 250/557 |
| 5,680,157 A | 10/1997 | Bidiville et al. | |
| 5,686,720 A | 11/1997 | Tullis | |
| 5,703,353 A | 12/1997 | Blalock et al. | |
| 5,703,356 A | 12/1997 | Bidiville et al. | |
| 5,729,008 A | 3/1998 | Blalock et al. | 250/208.1 |
| 5,729,009 A | * 3/1998 | Dandliker et al. | 250/208.2 |
| 5,769,384 A | 6/1998 | Baumgartner et al. | |
| 5,786,804 A | 7/1998 | Gordon | |
| 5,793,032 A | 8/1998 | Bard et al. | |
| 5,825,044 A | 10/1998 | Allen et al. | 250/557 |
| 5,854,482 A | 12/1998 | Bidiville et al. | |
| 5,907,152 A | * 5/1999 | Dandliker et al. | 250/221 |
| 5,940,217 A | 8/1999 | Broome et al. | 359/618 |
| 5,952,997 A | 9/1999 | Hu | |
| 5,994,710 A | 11/1999 | Knee et al. | 250/557 |
| 6,002,525 A | 12/1999 | Poulo et al. | 359/642 |
| 6,021,009 A | 2/2000 | Borodovsky et al. | 359/888 |
| 6,031,218 A | 2/2000 | Piot et al. | |
| 6,040,592 A | 3/2000 | McDaniel et al. | 257/292 |
| 6,040,950 A | 3/2000 | Broome | 359/820 |
| 6,049,338 A | 4/2000 | Anderson et al. | |
| 6,057,540 A | 5/2000 | Gordon et al. | 250/221 |
| 6,084,574 A | 7/2000 | Bidiville | |
| 6,104,020 A | 8/2000 | Knee et al. | |
| 6,124,587 A | 9/2000 | Bidiville et al. | |
| 6,145,746 A | 11/2000 | Bard et al. | |
| 6,151,015 A | 11/2000 | Badyal et al. | |
| 6,175,357 B1 | 1/2001 | Gordon | |
| 6,188,057 B1 | 2/2001 | Misek | |
| 6,218,659 B1 | 4/2001 | Bidiville et al. | |
| 6,225,617 B1 | 5/2001 | Dandliker et al. | |
| 6,233,368 B1 | 5/2001 | Badyal et al. | |
| 6,281,882 B1 | 8/2001 | Gordon et al. | |
| 6,380,927 B1 | 4/2002 | Ostrum et al. | |
| 6,462,330 B1 | 10/2002 | Venkat et al. | |

OTHER PUBLICATIONS

"Agilent ADNS–2030 Low Power Optical Mouse Sensor, Data Sheet," Agilent Technologies, Mar. 12, 2003, pp. 1–36.

"Agilent ADNK–2030 Solid–State Optical Mouse Sensor, Sample Kit," Agilent Technologies, Mar. 10, 2003, p. 1.

"Product Change Notice, PCN: A03–15–00476012–1A," Agilent Technologies, Feb. 17, 2003, pp. 1–2.

"Product Change Notice, PCN: A03–018–00476012–1B," Agilent Technologies, Jul. 18, 2003, pp. 1–3.

* cited by examiner

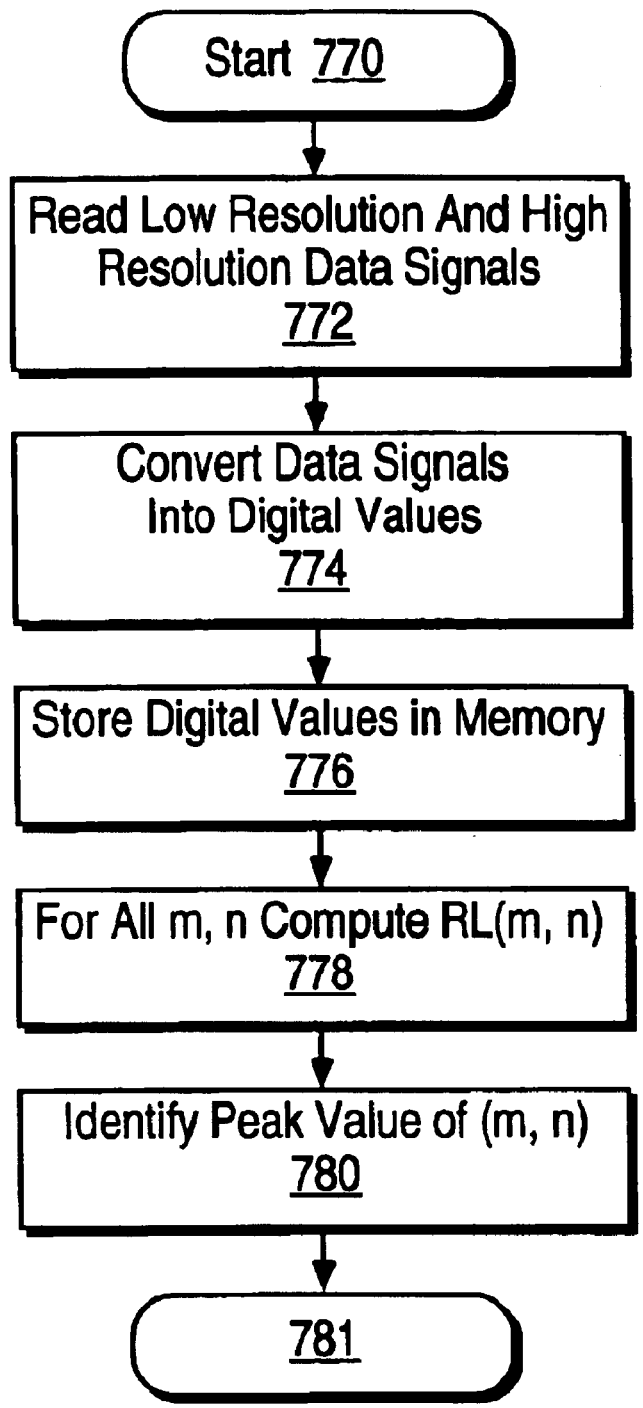
FIG. 7B(1)

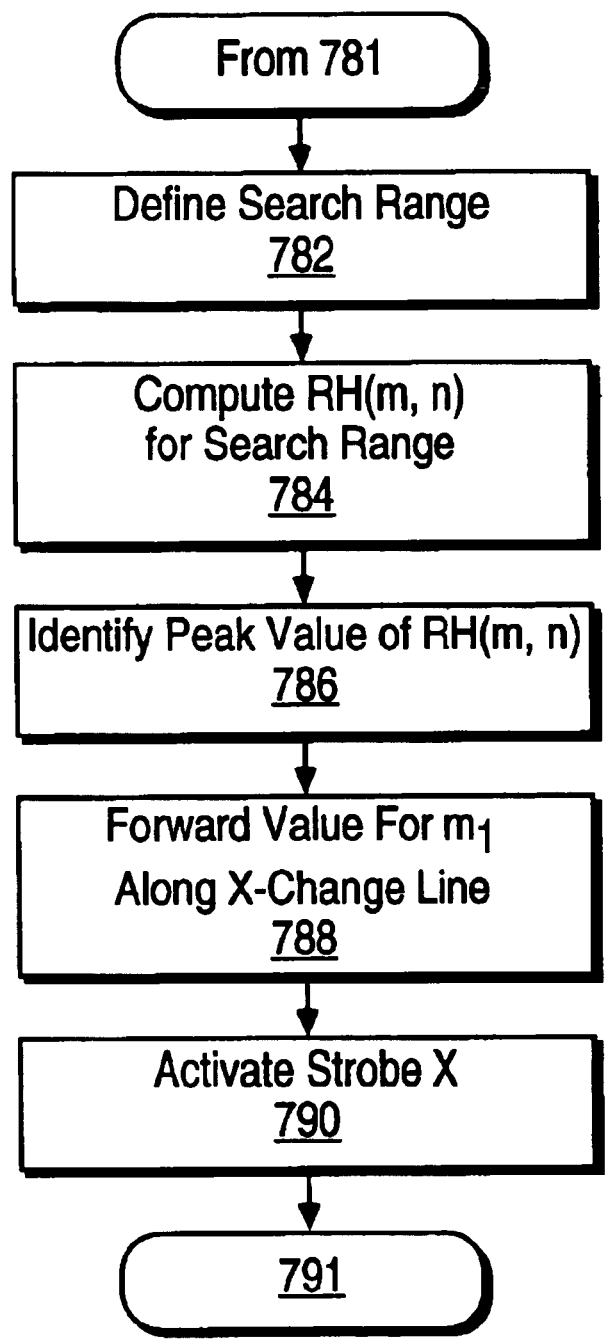
FIG. 7B(2)

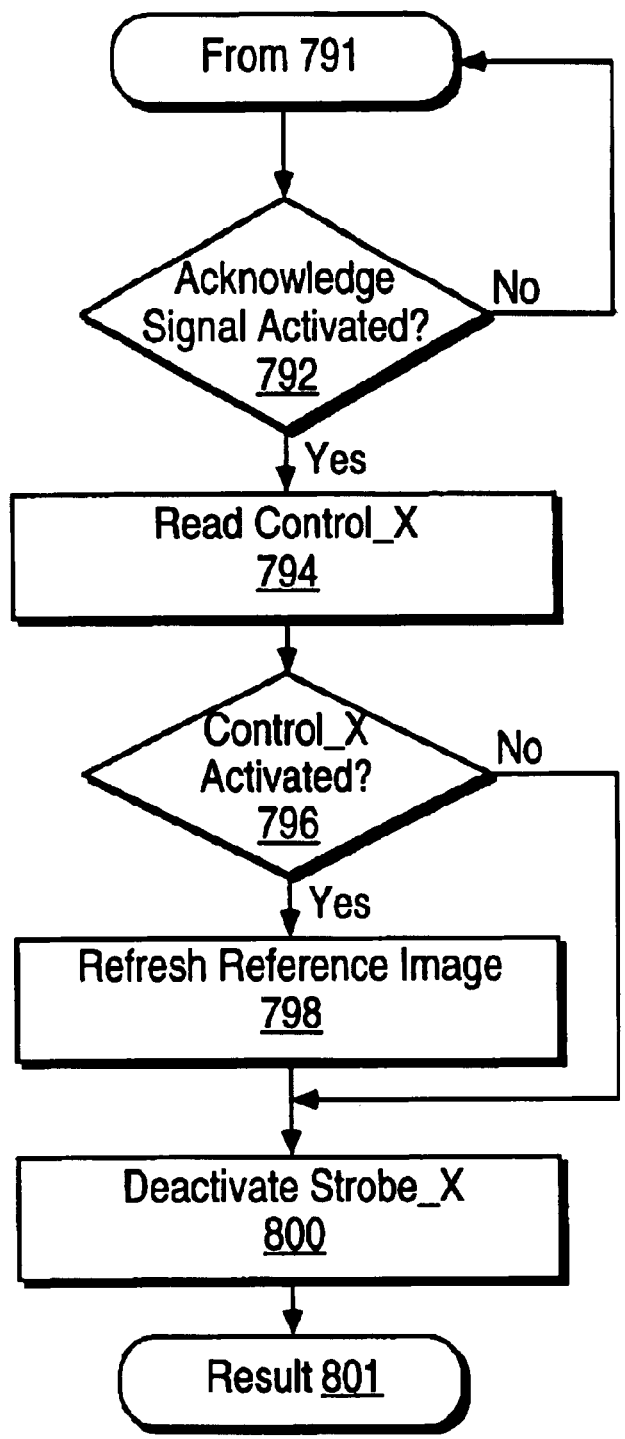
FIG. 7B(3)

OPTICAL DETECTION SYSTEM, DEVICE, AND METHOD UTILIZING OPTICAL MATCHING

CROSS-REFERENCE TO RELATED APPLICATION

This application is a continuation of U.S. patent application Ser. No. 08/869,471, filed Jun. 5, 1997, now U.S. Pat. No. 6,256,016.

BACKGROUND OF THE INVENTION

1. Field of the Invention

The present invention relates to pointing devices for cursors on video display screens in a data processing environment. More particularly, the present invention relates to an optical system, device, and method for imaging a surface to perceive a displacement of the surface without having mechanically moving parts or without requiring a specially patterned surface.

2. Description of the Related Art

Pointing devices, such as a mouse or a trackball, are well known peripheral devices in data processing environments. Pointing devices allow for cursor manipulation on a visual display screen of a personal computer or workstation, for example. Cursor manipulation includes actions such as rapid relocation of a cursor from one area of the display screen to another area or selecting an object on a display screen.

In a conventional electromechanical mouse environment, a user controls the cursor by moving the electromechanical mouse over a reference surface, such as a rubber mouse pad so that the cursor moves on the display screen in a direction and a distance that is proportional to the movement of the electromechanical mouse. Typically, the conventional electromechanical mouse consisted of a mechanical approach where a ball is primarily located within the mouse housing and a portion of the ball is exposed to come in contact with the reference surface so that the ball may be rotated internally within the housing.

The ball of the conventional electromechanical mouse contacts a pair of shaft encoders. The rotation of the ball rotates the shaft encoders, which include an encoding wheel that has multiple slits. A light emitting diode ("LED"), or similar light source, is positioned on one side of the encoding wheel, while a phototransistor, or similar photosensor, is positioned opposite to the LED. When the ball rotates, the rotation of the encoding wheel results in a series of light pulses, from the LED shining through the slits, that are detected by the phototransistor. Thus, the rotation of the ball is converted to a digital representation which is then used to move the cursor on the display screen.

The conventional electromechanical mouse is a relatively accurate device for cursor manipulation. The electromechanical mouse, however, has drawbacks associated with many other devices that have mechanical parts. Namely, over time the mechanical components wear out, become dirty, or simply break down so that the cursor can no longer be accurately manipulated, if at all.

An optical mouse reduces, and in some instances eliminates, the number of mechanical parts. A conventional optical mouse uses a lens to generate an image of a geometric pattern located on an optical reference pad. The conventional optical mouse uses a light beam to illuminate an optical reference pad having a special printed mirror geometric pattern. The geometric pattern is typically a grid of lines or dots that are illuminated by the light source and then focused by a lens on a light detector in the conventional optical mouse.

Typically, the grids are made up of orthogonal lines with vertical and horizontal lines that are printed in different colors and so that when the grid is illuminated, the grid reflects light at different frequencies. The colors absorb light at different frequencies so that optical detectors of the optical mouse can differentiate between horizontal and vertical movement of the conventional optical mouse. The photodetector picks up a series of light-dark impulses that consist of reflections from the printed mirror surface and the grid lines and converts the impulses into square waves. A second LED and photodetector, mounted orthogonally to the first, is used to detect motion in an orthogonal direction. The conventional optical mouse counts the number of impulses created by its motion and converts the result into motion information for the cursor.

The conventional optical mouse provides the advantage of reducing or eliminating the number of mechanical parts. The conventional optical mouse, however, has several drawbacks. One problem with the conventional optical mouse is that it requires an optical pad as described above. To eliminate the optical pad, a coherent light source was used with the conventional optical mouse. The coherent light source illuminated the surface directly below the mouse on most surfaces, except mirror-like surfaces. The use of a coherent light source, however, produced more problems.

The first problem the conventional coherent light optical mouse incurs is from the use of coherent light and speckles. Speckles are a phenomenon in which light from a coherent source is scattered by a patterned surface, such as the grid, to generate a random-intensity distribution of light that gives the surface a granular appearance. In the conventional coherent light optical mouse it is necessary to generate images of speckles to replace the optical pad. The imaging resolution is given by a photosensor pitch, e.g., the distance between two neighboring pixels or the periodicity, $\Lambda$, of the detector, a value that typically ranges from 10 micrometers to 500 micrometers. Elements in the image plane having a size smaller than this periodicity are not properly detected.

A pattern is improperly detected by an imaging device when it is too small. The image is ambiguous if the pattern is smaller than the pixel size. A measure of speckle size, or more precisely speckle average diameter $\Delta$, can be shown as $\Delta=(2/\pi)(\lambda/AP)$, where $\lambda$ is the light wavelength and AP is a measure of an aperture of the optical system. The aperture of the optical system may be defined as $AP=(wp/di)$, where wp is half the diameter of the aperture and di is the distance from the lens to the image plane.

Conventional coherent light optical systems found in the conventional coherent light optical mouse devices exhibit AP values in the range of 0.2 to 0.8. The maximal speckle size is then approximately $10\lambda$. For commercially available coherent light sources ($\lambda=0.6$ to 0.96 micrometers), imaging such a small pattern is currently not achievable at full resolution with current semiconductor technology. Thus, ambiguous and hard to interpret data is read from the sensor when a speckle is smaller than the imaging resolution. This, in turn, leads to erroneous displacement estimates that adversely affect system performance by producing an erroneous displacement sign value.

Conventional optical systems that use a coherent light source produce an illumination spot that must be correctly aligned with a sensor to generate a speckled surface image. Mechanical positioning of the illumination spot is achieved with some tolerance, such that the illuminated spot image on the image plane must be wider than the sensor to make sure the sensor is fully covered by the image of the illumination spot. Having a wide spot results in a reflected spot having a reduced power intensity that the photosensor array must detect. Thus, attempts by conventional optical systems to solve position tolerance, i.e., misalignment, were accompanied by a loss of reflected light that can be captured by the photosensor array.

Another problem with conventional optical pointing devices based on speckle image analysis is sensitivity of an estimation scheme to statistical fluctuations. Because speckles are generated through phase randomization of scattered coherent light, the speckle pattern has a defined size on average, but can exhibit local patterns not consistent with its average shape. Therefore, it is unavoidable for the system to be locally subjected to ambiguous or hard to interpret data, such as where a speckle count observed by the imaging system is small.

An additional problem in conventional optical pointing devices is attaining a small displacement resolution without significantly increasing costs due to increased hardware complexities and increased computational loads. Various methods exist to estimate relative displacement from the analysis of two images of a moving target based on correlation techniques. Typically the correlation between the newly acquired image and the previous image is computed, and the estimated displacement between the two images is found at the spatial coordinates where a peak of the correlation function occurs. An exhaustive search of the peak value is possible after all values of the cross-correlation function are computed.

New images are acquired on a regular basis, at an acquisition rate allowing at least one common part of the image to be included in two successive snapshots, even at high speed. The smallest resolvable displacement, or displacement resolution, is the image resolution, e.g., the photodetector array periodicity $\Lambda$, divided by the optical magnification, mag, where mag=(di/do), and di, do are defined as the image distance and the object distance, respectively, as referenced to the lens position.

For even higher displacement resolutions, sub-pixel displacement can be obtained through interpolation by a factor I, however with an excessive increase of computations. Evaluations of the cross-correlation function of two images of size M×M requires roughly $4(M^4)$ Multiply-And-Accumulate (MACs), which translates into 4 $(M^4)$T_acq instructions-per-second (MIPs/1,000,000), where T_acq is the time period between two acquisitions. Typically, T_acq is between 50 microseconds and 1 millisecond. Such large computational load required costly and power hungry digital hardware which is difficult to integrate in a small hand held pointing device.

One more problem with conventional optical pointing devices based on cross-correlation detection is that they are insensitive to displacement occurring when the pointing device speed is lower than the image resolution divided by (mag*T_acq), that is for a displacement smaller than a pixel. Any diagonal displacement at low speed may be registered along one direction and ignored along the other depending on the two displacement components compared to the detection limit. This effect translates into the cursor being "snapped" along the fastest moving direction.

Therefore, there is a need for a system and method that (1) provides for detection of motion of an optical pointing device relative to a surface; (2) provides an optical detection system with an optical sensing assembly having an optical element with an artificially limited aperture that is matched with a photosensor array to generate a speckle image and an image data signal therefrom; (3) provides an optical detection system with an optical sensing assembly having one or more lenses optically matched with one or more photosensor arrays to generate a speckle image and an image data signal therefrom; and (4) provides a method for generating an unambiguous image data signal to determine displacement relative to a surface.

SUMMARY OF THE INVENTION

Generally, the present invention includes an optical detection system, device, and method for detection of motion of an optical pointing device relative to a surface. The system and method of the present invention includes a coherent light source, an optical sensing assembly, a cross-correlation module, and a microcontroller.

The coherent light source, for example, a laser diode, produces a coherent light beam that generates an illumination spot on a surface, or object plane, and is scattered off of the surface. The scattered light is directed towards, and received by, the optical sensing assembly. The optical sensing assembly includes one or more photosensor arrays and one or more optical elements. Each photosensor array of the plurality of photosensor arrays includes pixels of a particular size and a defined shape. The pixel is a single photosensitive element in the photosensor array. In addition, each optical element of the plurality of optical elements includes an artificially limited aperture. The received reflected illumination spot passes through the optical elements and forms speckle images on the photosensor, or image, plane.

The optical sensing assembly is configured so that each artificially limited aperture is optically matched, either isotropically for a square pixel or anisotropically for other pixel shapes, to a corresponding photosensor array based on that photosensor array's pixel shape. Optical matching allows for the set of speckle images, having a varying speckle size, to have a single speckle cover at least one pixel of the photosensor array. Note that optical matching makes sure that the average size of a speckle image is larger than the pixel for both x and y directions. The pixel values from the speckle image that are received by the photosensor array provides an unambiguous speckle image data signal that is stored in a storage medium for further processing. If the pixel values of the speckle images are captured and converted to digital form for storage, the storage medium may be digital memory. If pixel values of the speckle images are captured and directly stored in voltage form, the storage medium may be an analog memory, such as a capacitor array, e.g., a bucket brigade device ("BBD") or a charge coupled device ("CCD").

When there is movement of the optical mouse, the optical sensing assembly generates a new set of speckle images on the pixels of the photosensor arrays. For a displacement smaller than the illumination spot, the displacement of the surface translates into an equivalent speckle image displacement. The new unambiguous speckle image data signal generated by the photosensor arrays is captured in the storage medium. The new speckle image data signal and the previous speckle image data signal that are stored in the storage medium are then used to perform an image motion detection calculation, such as a cross-correlation analysis, using a cross-correlation module to determine the displacement of the two sets of speckle images. The calculated displacement corresponds to the movement of the optical pointing device.

One cross-correlation analysis can occur when there is a multi-resolution image scheme. In particular, the cross-correlation analysis between the new speckle image data signal and the previous speckle image data signal is computed over a limited set of points. In particular, this set of points is all points in a low resolution image area plus a small range of points around the estimated displacement in a high resolution image area. The displacement related to the movement is determined by where a cross-correlation function of the cross-correlation analysis peaks. Using and applying the cross-correlation analysis over a limited set of points significantly reduces the processing power necessary to achieve a desired precision of determining displacement, or movement, of the optical pointing device.

Another cross-correlation analysis can occur where there is a single resolution image scheme. In particular, the cross-correlation analysis between the new speckle image data signal and a reference, or previous, speckle image data signal is computed in one dimension—along a direction perpendicular to the elongated speckle images. The effects of lateral motion from the other direction is minimized because the speckles are elongated in that direction, therefore, producing little change in the image data signal as long as lateral displacement is smaller than the largest dimension of a pixel of a photosensor array. The one-dimensional cross-correlation analysis reduces power consumption because fewer calculations are required to determine displacement of the optical pointing device.

Generally, a method of the claimed invention includes producing a coherent light beam and scattering the coherent light beam off of a surface. The scattered coherent light is received by an optical sensing assembly. The received scattered coherent light travels through a plurality of optical elements, where each optical element includes an artificially limited aperture that is matched with a photosensor array of a plurality of photosensor arrays. Through optical matching, the speckle image generated through each optical element is passed onto an associated photosensor array on which each speckle has a size larger than the pixel size on average.

The optically matched photosensor arrays and corresponding artificially limited aperture of the optical elements generate a set of unambiguous speckle image signals that is stored in a storage medium. A cross-correlation analysis is performed between the unambiguous image signal that is stored and a subsequent unambiguous image data signal that is generated at periodic instances when movement is detected within the system. Precision of determining a displacement is attained through the search of a cross-correlation function over a limited set of points, where the displacement is found at the coordinates where the cross-correlation function of the cross-correlation analysis peaks.

The claimed invention advantageously provides an optical detection system that detects movement of an optical pointing device relative to a surface that can generate speckle images. The claimed invention includes an optical sensing assembly having one or more optical elements and one or more artificially limited apertures that are optically matched to a plurality of photosensor arrays that generate an unambiguous image data signal from a speckle image formed from a diffusely scattered coherent light beam. The unambiguous image data signal is used to detect movements with greater precision without requiring greater system resources such as computational power and/or illumination power. Further, the claimed invention overcomes the adverse affects of position tolerance by allocating additional identical optical elements for each photosensor array so that the overlapping images of the illumination spot are generated to adequately cover each photosensor array even with worst case misalignment considerations.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 7b is a flow diagram illustrating operation of a 2-D cross-correlation module and microcontroller of the multi-resolution displacement detection system in accordance with the present invention;

DETAILED DESCRIPTION OF THE PREFERRED EMBODIMENT

Figure 1:
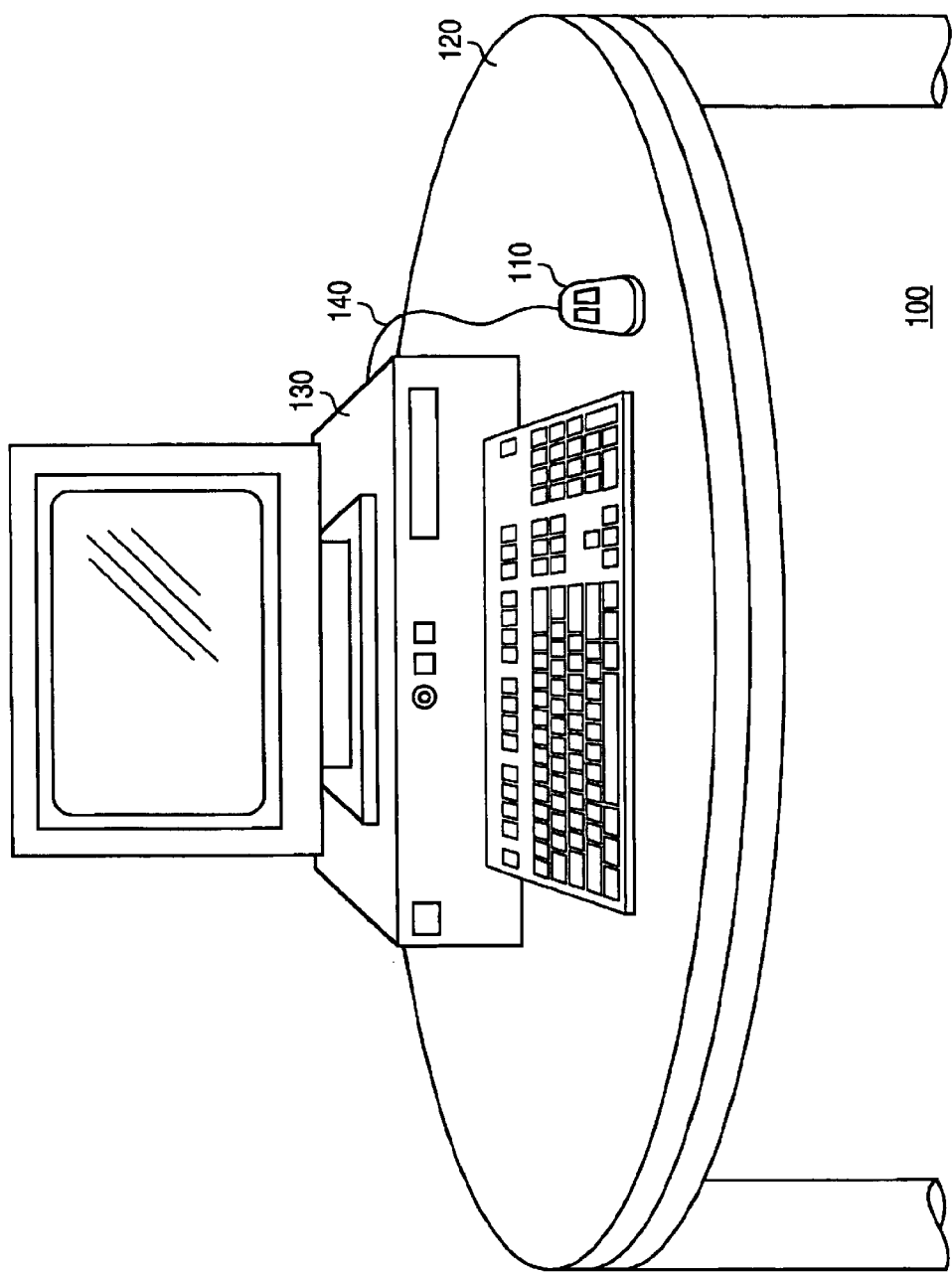
FIG. 1 is a diagram of an operating environment in accordance with the present invention.

FIG. 1 is a diagram of an embodiment of an operating environment 100 in accordance with the present invention. The operating environment 100 includes an optical pointing device 110, a surface 120, and a computer system 130. The surface 120 may be any surface that can diffusely reflect light, such as a table or desk, for example. The computer system 130 may be a conventional computer system such as an IBM PCT™, Apple MacIntosh™. Sun SPARCStation™, or the like. The computer system 130 includes a processor, a memory, a display screen, and an input port for a pointing device. The optical pointing device 110 is coupled to the input port of the computer system 130. It is noted that although the optical pointing device 110 may be coupled to the input port of the computer system 130 using a wire connection such as an optical pointing device cable 140, other coupling connections such as infrared or radio frequency control may also be applicable.

Figure 2A:
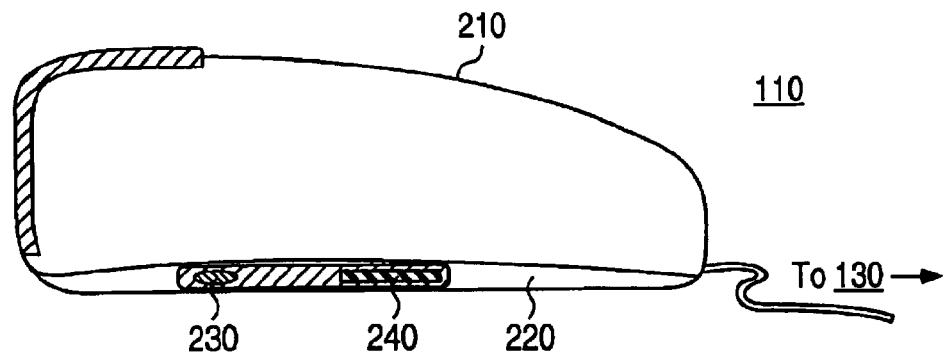
FIG. 2a is an external diagram of an optical pointing device in accordance with the present invention.

FIG. 2a is an external diagram of the optical pointing device 130 in accordance with the present invention. Externally, the optical pointing device 130 includes a shell housing 210 having an underside 220. The underside 220 includes a coherent light emission area 230 for emission of a coherent light source 250 and a light detection area 240 for an optical sensing assembly 260. In a preferred embodiment of the present invention, the coherent light source 250 is a laser diode. In an alternative embodiment, the coherent light source 250 may also be another coherent light emitting source or may be a partially coherent light emitting source, in which the coherent light component is used by the optical pointing device 130. The laser diode comprises a light emitting die and a transparent package that performs collimation or beam shaping. In an alternative embodiment, the laser diode comprises a light emitting die and an independent beam shaping optical element to perform collimation or other beam shaping. Also, in accordance with the present invention, the underside 220 of the optical detection system 110 is placed on or in close proximity to the surface 120 during operation.

Figure 2B:
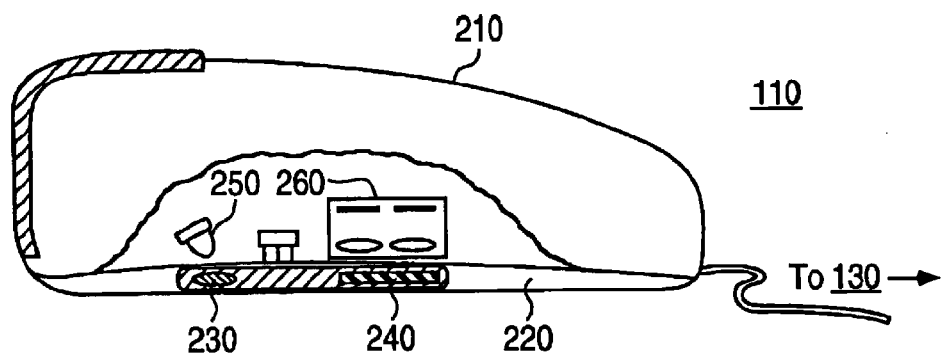
FIG. 2b is a partial internal diagram of an optical pointing device in accordance with the present invention.

FIG. 2b is a partial internal diagram of the optical pointing device 130 in accordance with the present invention. Internally, the optical pointing device 130 includes the coherent light source 250 and the optical sensing assembly 260. In one embodiment, the coherent light source 250 is directed such that a coherent light beam would be emitted through the coherent light emission area 230 towards the surface 120. The coherent light beam from the coherent light source 250 is then partially reflected off of the surface 120 toward the light detection area 240, and more specifically, the optical sensing assembly 260. In a preferred embodiment, the coherent light beam is a collimated beam 305. In an alternative embodiment, a quasi-collimated beam is used, where a certain degree of convergence or divergence is applied. Further, in a preferred embodiment, the coherent light emission area 230 and the light detection area 240 are collectively a single area.

Figure 3:
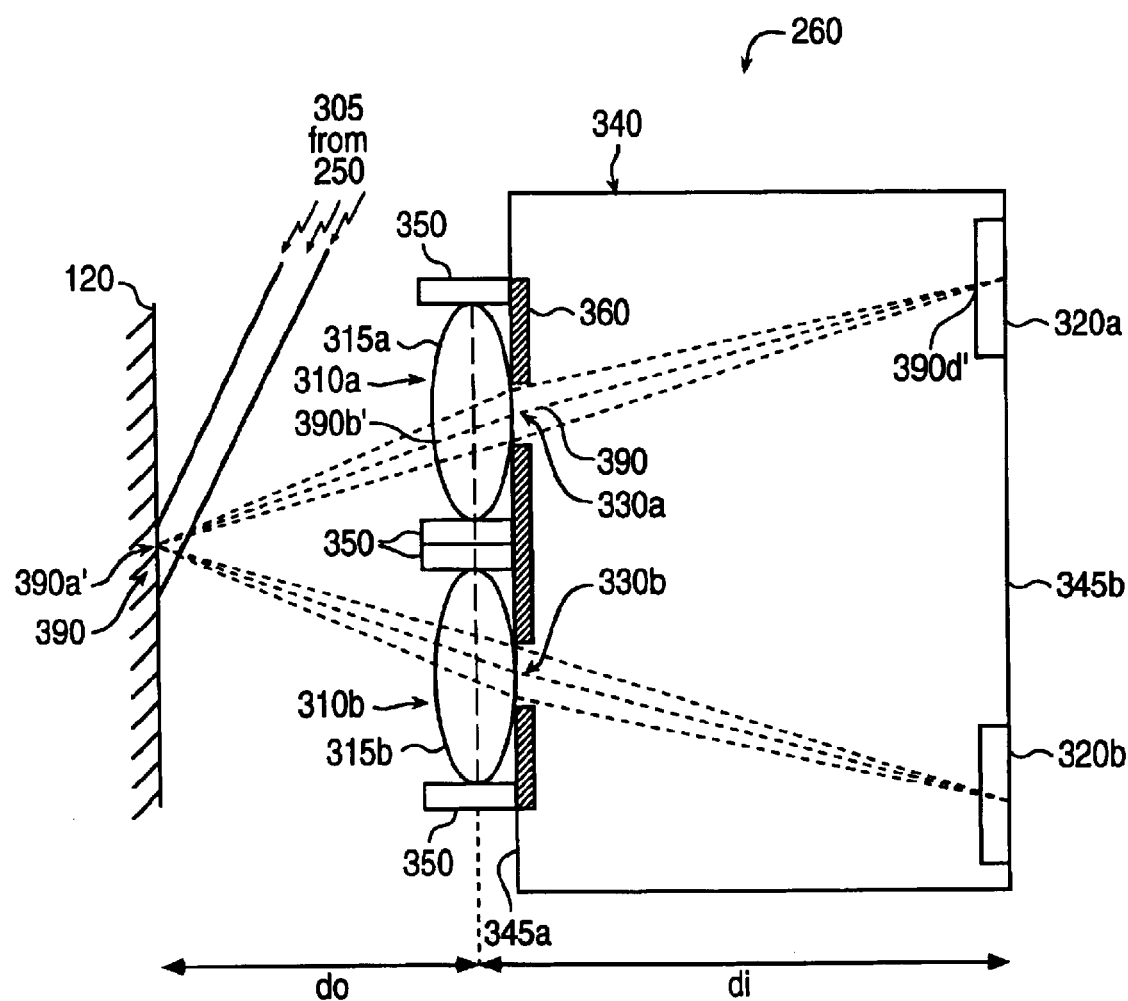
FIG. 3 is a diagram illustrating generally an optical sensing assembly in accordance with the present invention.

FIG. 3 is a diagram illustrating the optical sensing assembly 260 in accordance with the present invention. The optical sensing assembly 260 comprises one or more optical elements 310, one or more photosensor arrays 320, a transparent printed circuit board 340, and molded fittings 350. For purposes of illustration, the optical sensing assembly 260 is described with two optical elements 310a, 310b (generally referenced as 310) and two photosensor arrays 320a, 320b (generally referenced as 320). In one embodiment there is at least one optical element 310 for each photosensor array 320a, 320b.

The transparent printed circuit board 340 includes a first side 345a and a second side 345b. The first side 345a includes a microlens array 360, which is further discussed below. Alternatively, an opaque printed circuit board may be used, however, it must be fitted with openings to allow light to pass through to the photosensor arrays 320a, 320b. The second side 345b, which is opposite the first side 345a, includes the photosensor arrays 320a, 320b, with the sensitive side facing towards the microlens array 360.

Each optical element 310a, 310b includes a lens 315a, 315b (generally referenced as 315) having a focal length, $f$, an artificially limited aperture 330a, 330b (generally referenced as 330), AP, and molded fittings 350. In the preferred embodiment, the focal length, $f$, is between 1 mm and 5 mm, for example. In the preferred embodiment, each artificially limited aperture 330a, 330b, AP, has an aperture half-diameter, wp, and is integrated with its respective lens 315a, 315b, for example, by attaching an aperture mask onto each lens 315a, 315b. The molded fittings 350 are coupled to the lens 315a, 315b on edges opposite to each other. In a preferred embodiment, the molded fittings 350 may be integrated with each lens 315a, 315b to form a single integrated optical piece. The optical elements 310a, 310b are arranged as a single, refractive microlens array 360. Alternatively, the optical elements 310a, 310b may be arranged as a single diffractive microlens array 360, in which case the aperture function is directly combined with the lens function. The microlens array 360 includes integrated aperture openings for each optical element 310a, 310b. Alternatively, the microlens array 360 may include the beam shaping optical element.

Each optical element 310a, 310b is positioned and coupled on the microlens array 360 so that each artificially limited aperture is centered about its respective aperture opening. The assembled microlens array 360 is coupled to the first side 345a of the transparent printed circuit board 340 of the optical sensing assembly 260. In a preferred embodiment, object distance, do, and image distance, di, are related by $(1/f)=(1/do)+(1/di)$, where $f$ is the focal length and mag (di/do), where mag is the magnification of the optical imaging system.

Figure 4A:
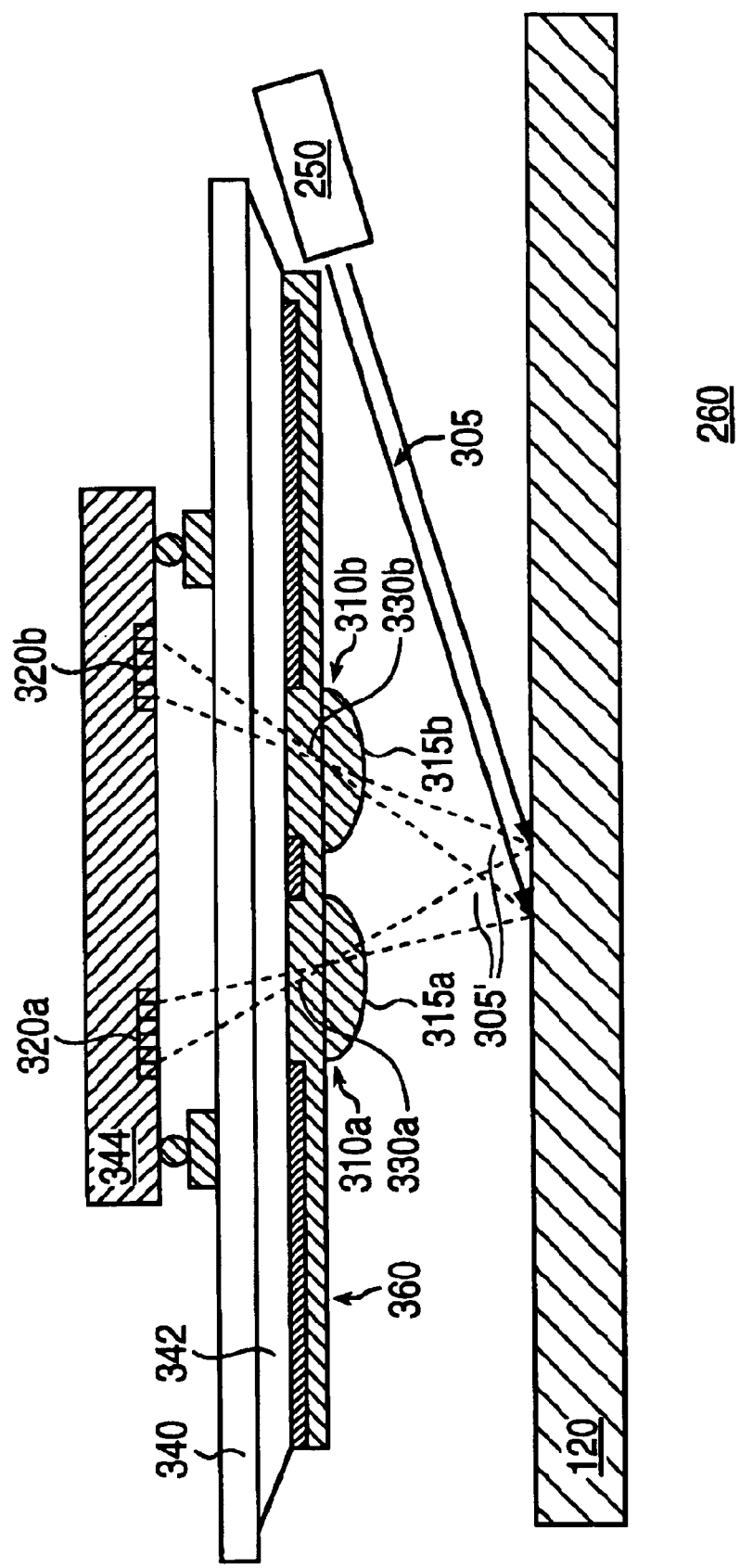
FIG. 4a is a diagram illustrating a cross-sectional view of the optical sensing assembly in accordance with the present invention.
Figure 4B:
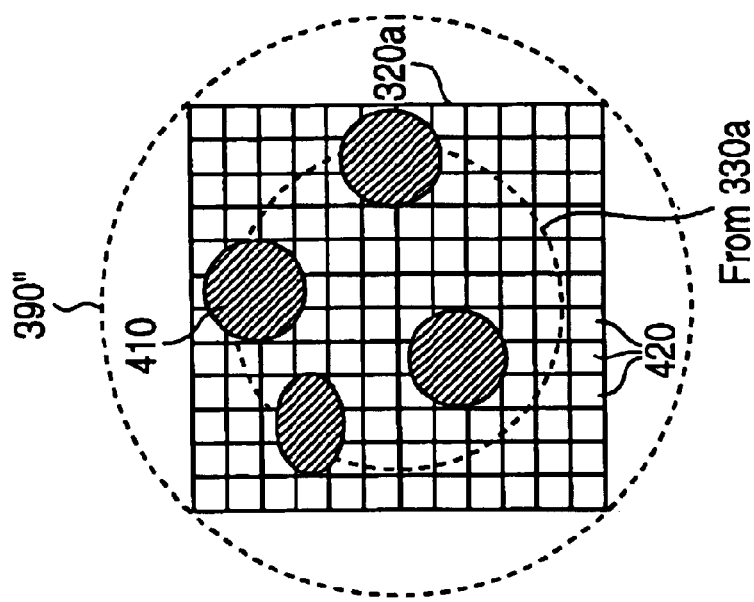
FIG. 4b is a symbolic view illustrating a speckle field image on a photosensor array in accordance with the present invention.
Figure 4B:
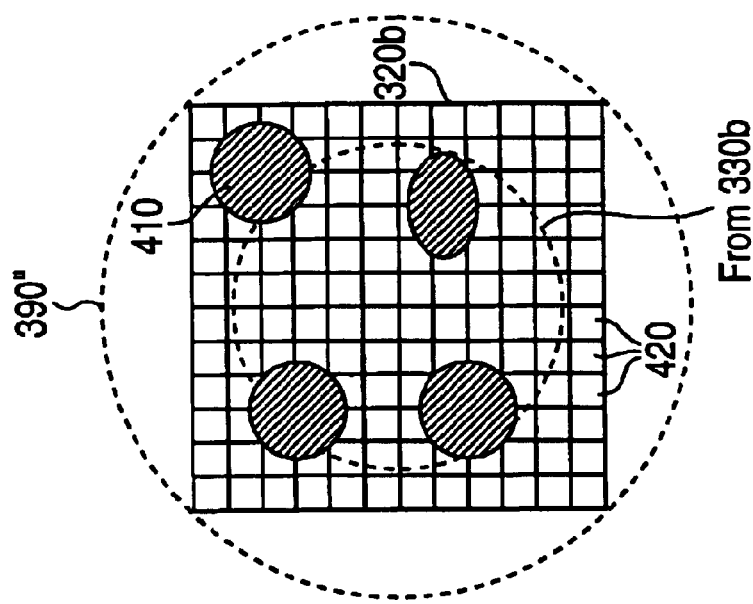

Each photosensor array 320a, 320b is comprised of one or more pixels 420, further illustrated as individual squares in FIG. 4b. A pixel 420 is a single photosensitive element in the photosensor array 320a, 320b that can detect a light intensity. In a preferred embodiment the number of pixels 420 can range from 4 by 4 to 30 by 30, for example. In one embodiment, each pixel 420 has a defined isotropic size and shape where the size may be defined as the distance between two neighboring pixels 420 as opposed to the size of the light sensitive area of the pixel. The photosensor arrays 320a, 320b capture image data by generating image data signals based on pixel values generated as a result of an image covering the pixels 420. The distance between two successive pixels 420 is a photosensor pitch, e.g., the periodicity, $\Lambda$. The photosensor pitch defines the size of a pixel and describes the resolution of the system, e.g., the smallest discernible element in the image plane.

The microlens array 360 and the photosensor arrays 320a, 320b are geometrically aligned so that an image produced on each photosensor array 320a, 320b is the image of a common, yet unique, illuminated spot 390 obtained through a spot fan-out. Spot fan-out is when the image of the same illuminated spot 390 is received at different photosensor arrays within the optical sensing assembly 260 after passing through the associated optical element 310. In a preferred embodiment, spot fan-out results when the center 390a' of the spot 390, the center 390b' of a lens 315a, 315b, the center 390c' of an aperture 330a, 330b, and the center 390d' of a photosensor array 320a, 320b are all aligned on a straight line.

Using a spot-fan out feature, the collimated beam 305 from the coherent light source 250 can be of a minimal size, about the size of the largest photosensor array. The minimal size of the collimated beam 305 produces a high intensity spot 390 that is easier to detect reliably, while reducing power consumption within the system through the use of a low illumination coherent light source 250. This is in contrast to conventional systems where the collimated beam must be wide enough so that the image of an illumination spot covers a surface large enough to include all the photosensor arrays, thus requiring a coherent light source that consumes greater power. In accordance with the present invention, the spot fan-out feature may also be used to generate multiple images by scattering, or diffusely reflecting, the same illuminated spot 390 through the optical elements 310 on one or more photosensor arrays 320*a*, 320*b*, either overlapping each other or not, to illuminate the photosensor array 320*a*, 320*b* with a sum of small images of the spot.

FIG. 4*a* is a diagram illustrating a cross-sectional view of the optical sensing assembly in an optical detection system in accordance with the present invention. In particular, the optical sensing assembly 260 is shown to include the microlens array 360 having the optical elements 310*a*, 310*b*, including the lenses 315*a*, 315*b* and the artificially limited apertures 330*a*, 330*b*, the photosensor arrays 320*a*, 320*b*, and the transparent printed circuit board 340. The optical sensing assembly 260 is also shown to include an air or a transparent adhesive 342 layer between the microlens array 360 and the transparent printed circuit board 340.

In one embodiment, the photosensor arrays 320*a*, 320*b* reside on a single silicon die layer 344. In a preferred embodiment, the silicon die is mounted on the printed circuit board 340 using, for example, a flip-chip mounting technology. Further, in a preferred embodiment, the microlens array 360 is a diffractive microlens array. A diffractive microlens array allows for an artificially limited aperture to be included by design in the diffractive pattern together with the lens function so that the aperture is aligned with the lens.

As illustrated in FIG. 3 and again in FIG. 4*a*, the collimated beam 305 from a coherent light source 250 is directed towards a surface 120. The collimated beam 305 produces the illumination spot 390, including a spot center 390*a*', on the surface 120. The surface 120 scatters, i.e. diffusely reflects, the collimated beam 305 at the location of the spot 390*a* towards the lenses 315 of the optical sensing assembly 260. The scattered light 305' passes through the central point, *f'*, of the lenses 315*a*, 315*b*, through the artificially limited apertures 330*a*, 330*b*, and to the photosensor arrays 320*a*, 320*b*, in a fan-out manner, as described above. The scattered light 305' that passes through the optical elements 310*a*, 310*b* generates speckle images on the respective photosensor arrays 320*a*, 320*b* as is further described below. A speckle image may be defined as a phenomenon in which a light beam from a highly coherent source is scattered off of a surface or medium to generate a random intensity distribution of light that give the surface or medium a granular appearance.

FIG. 4*b* illustrates an example of a speckle field image that appears on the photosensor arrays 320*a*, 320*b* in accordance with the present invention. The speckle field image includes one or more speckles 410. Each photosensor array 320*a*, 320*b* has pixels 420 that are isotropic, i.e., of the same size in both the x-direction and the y-direction (e.g., a square) relative to an x-y plane, with respect to other pixels of the other photosensor array. Each photosensor array 320*a*, 320*b* is geometrically aligned with an associated optical element 310*a*, 310*b*, as described above in FIG. 3, as well as the illumination spot 390 location, so that the spot fan-out feature is applicable.

A symbolic view of the artificially limited aperture 330*a*, 330*b* is shown in FIG. 4*b* as a first dotted outline 330*a*', 330*b*' on each photosensor array 320*a*, 320*b*. The second dotted outline 390" illustrates the size of the image of the illumination spot 390 relative to the photosensor array 320*a*, 320*b*. The dark spots illustrate speckle images 410 that appear on the photosensor arrays 320*a*, 320*b*.

In the symbolic view of FIG. 4*b*, the speckle field image that is received by the photosensor arrays 320*a*, 320*b* appears when the diffusely reflected light from the illumination spot 390 is received and passed through the optical element 310*a*, 310*b* having the artificially limited aperture 330*a*, 330*b* that is associated with the respective photosensor array 320*a*, 320*b*. More particularly, the speckle field image is based on the scattered light 305' from the reflected illumination spot 390 and is received and passed through the optical sensing assembly 260. The scattered light from the illumination spot 390 that is passed through the optical elements 310*a*, 310*b* and is fanned out so that it appears on, and is received by the respective photosensor arrays 320*a*, 320*b*.

The speckle field image is unique to each photosensor array 320*a*, 320*b* because of the angle of reflection of the collimated beam 305 that is diffusely reflected from the illumination spot 390*a*' off of the surface 120, through the optical elements 310*a*, 310*b*, and fanned out onto the photosensor arrays 320*a*, 320*b*. Moreover, the speckle field image received by the photosensor arrays 320*a*, 320*b* are used to generate unambiguous speckle image data signals that advantageously provide a complete representation of a speckle image 410.

Figure 4C:
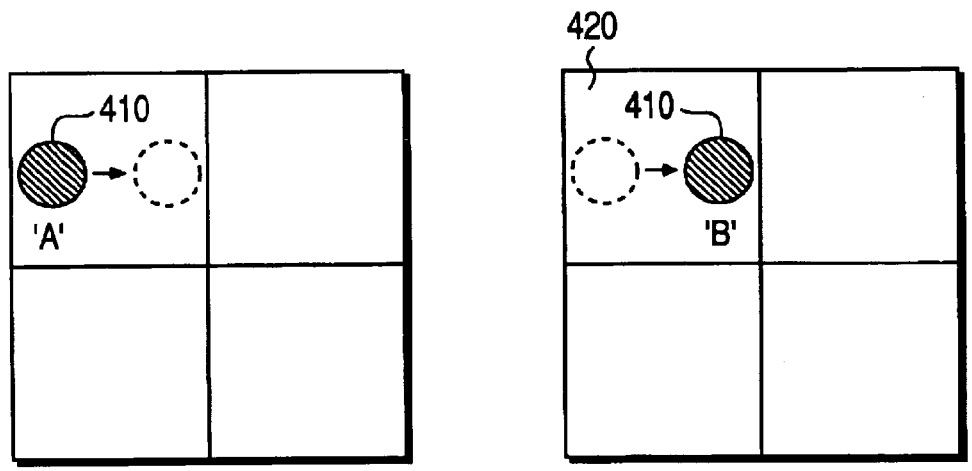
FIGS. 4c and 4d are symbolic views illustrating an ambiguous speckle image verses an unambiguous speckle image.
Figure 4D:
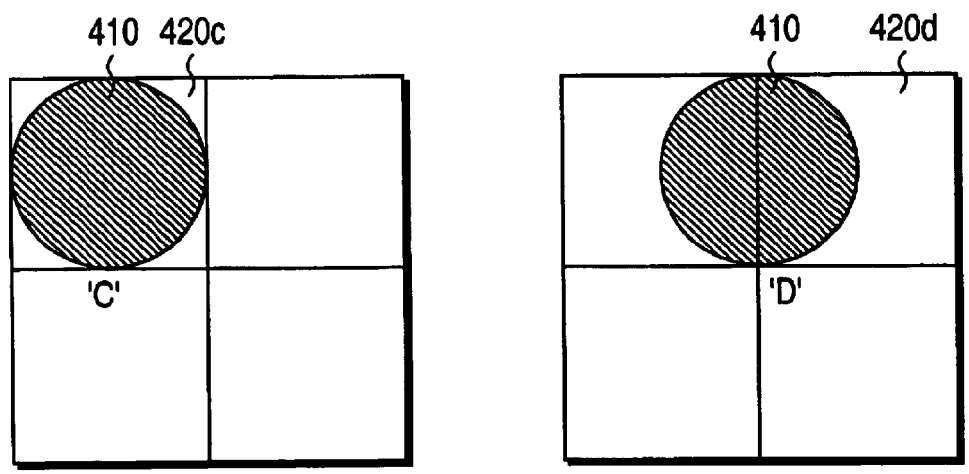

FIGS. 4*c* and 4*d* provide an example illustrating an ambiguous speckle image versus and unambiguous speckle image. Generally, an unambiguous speckle image data signal is obtained when it is known that the signal delivered by the pixels 420 capturing the speckle 410 will see at least some of the output value differ if a small displacement is applied to the surface of the speckle 410.

For example, in FIG. 4*c*, the speckle 410 is shown moving from point A to point B on a photosensor array 320 of an optical pointing device. The speckle displacement is a result of movement of an optical pointing device. The output of a pixel 420 of the photosensor array 320 is the sum of the light that impinges on the pixel 420 and because this sum is identical for both positions of the speckle 410, despite the new location of the speckle 410, there is only one set of values for calculating displacement. By contrast, in FIG. 4*d*, the speckle 410 is shown moving from point C to point D. In accordance with the present invention, the speckle translation is a result of translation of the optical pointing device 130. Here, there is a change in pixel value as the speckle 410 moves from one pixel 420*c* into a second pixel 420*d* so that one pixel 420*c* sees its output get lower while the other pixel 420*d* sees its output get larger. The result is two sets of values for calculating displacement of the optical pointing device 130. Thus, the speckle 410 in FIG. 4*d* produces an image signal that is unambiguous.

The unambiguous speckle image data signal allows for reconstruction of the speckle image 410 from the pixels 420 as further described below. The unambiguous data signal provides unambiguous and reliable motion detection when applying a motion detection analysis, such as a cross-correlation analysis, to the speckle image data signal. Specifically, the speckle images 410 are captured as speckle image data by the photosensor arrays 320*a*, 320*b* and will be used to determine displacement, or motion, of the optical pointing device 110 as will be further described below.

The unambiguous speckle image data signals obtained from the speckle image 410 illustrated in FIG. 4*b* are obtained through optical matching. Optical matching describes a property of an optoelectronic system, such as in an optical sensing assembly, matching a relevant feature of the optical subsystem to a relevant feature of the electronic photosensor array subsystem. In one embodiment, optical matching is a result of artificially limiting the optical aperture 330 for a given illumination wavelength so as to match the periodicity, or pitch, $\Lambda$, of the photosensor array 320. The optical matching relationship becomes $AP<(2/\pi)(\lambda/\Lambda)$, where AP is the aperture. $\lambda$ is the light wavelength, and $\Lambda$ is the periodicity, or pitch, of the photosensor array 320. For an anisotropic photosensor array, i.e., a photosensor array 320 having a different length and width, the optical matching relationship with reference to an x-y plane becomes $APx<(2/\pi)(\lambda/\Lambda x)$ for an x-direction and $APy<(2/\pi(\lambda/\Lambda y)$ for a y-direction. Thus, for a photosensor array 320 that is one pixel 420 in the x-direction and M pixels 420 in the y-direction, e.g., a (1×M) photosensor array 320, the pitch, $\Lambda$, is the pixel 420 length in the x-direction and the interpixel spacing for the y-direction. Similarly, for a photosensor array 320 that is M pixels 420 in the x-direction and one pixel 420 in the y-direction, e.g., a (M×1) photosensor array 320, the pitch is the pixel length in the y-direction and the interpixel spacing for the x-direction.

As a result of optical matching, the average diameter of a speckle in the speckle image 410 is larger than the pixel 420 size, where size refers to the pitch, $\Lambda$. For anisotropic pixels, further discussed below, optical matching is achieved when the average speckle diameter along the x-direction and the y-direction, respectively, are larger than the size of the pixel 420, along both the x-direction and the y-direction, respectively. Optical matching suppresses the occurrences of an ambiguous sample set of speckle image data signals generated by speckles 410 that are smaller than the pixel 420 size. This is because by matching the aperture 330 to the pitch, $\Lambda$, through the optical matching relationship, speckles 410 are larger than a single pixel 420 on average which makes motion detection from successive sets of speckle image data signals reliable. When optical matching is not achieved, difficulty arises from speckles 410 that are smaller than the pixel 420 size that produce image data signals that may not vary when a small displacement is applied to them.

In a preferred embodiment, optical matching is obtained through artificially limiting the aperture, AP, 330a, 330b of each optical element 310a, 310b. Optical matching is defined for numerical apertures that are below a threshold value, that is $AP<(2/\pi)\times(\lambda\Lambda)$. For example, a photosensor array having a pitch of 40 micrometers that is illuminated with a 900 nanometer coherent light source having an AP artificially limited to 0.014 can generate an unambiguous speckle image data signal from the speckle image 410. The unambiguous image data signal is referred to as a fully resolved data signal and allows for a reliable cross-correlation analysis for determining displacement. A fully resolved data signal describes a data signal that allows a faithful reproduction of the image covering the photosensor array 320 when the speckle image data signal was generated. A fully resolved data signal precludes speckles 410 smaller than a pixel 420 size since it is not known from the signal if one or more speckles were covering the pixel 420. Successive speckle images obtained from an optically matched optical sensing assembly allow for a cross-correlation analysis that provides a displacement value by looking for the peak of the cross-correlation function.

In a preferred embodiment of the present invention, the artificially limited apertures 330a, 330b of at least one optical element 310a, 310b is associated with at least one photosensor array 320a, 320b that has a matched resolution so that a speckle image 410 includes a speckle average size covering at least one pixel 420 of the photosensor array 320a, 320b. The optical elements 310a, 310b have artificially limited apertures 330a, 330b that are matched with the photosensor arrays 320a, 320b having matched resolution to reduce the impact of ambiguous data due to statistical fluctuations.

Figure 5A:
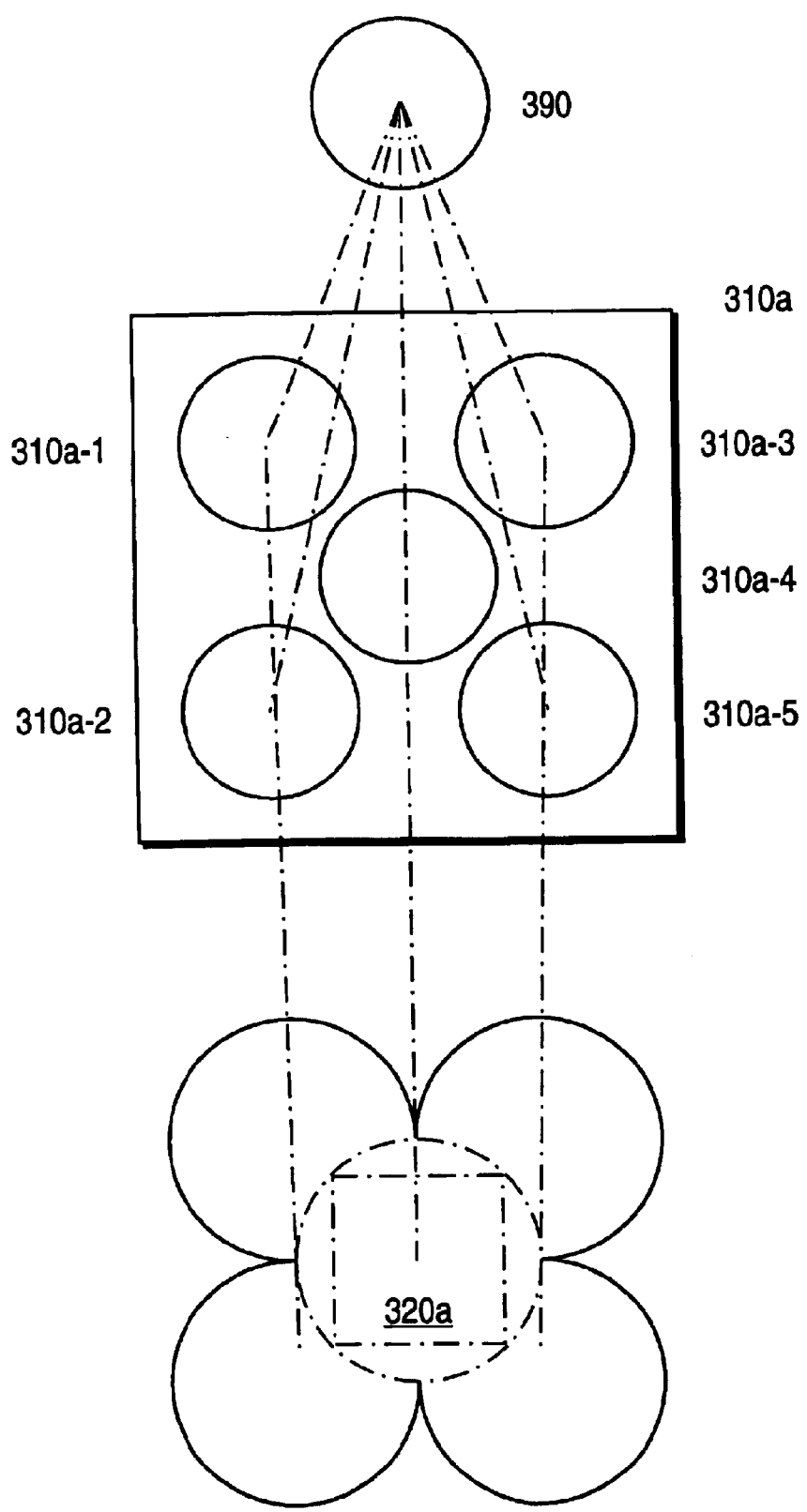
FIG. 5a is a diagram of an optical sensing assembly having multiple optical elements for each photosensor array in accordance with the present invention.

As shown in FIG. 5a, the optical assembly 260 in accordance with the present invention may use multiple optical elements 310a-1–310a-n, for example five optical elements 310a-1–310a-5, each having an artificially limited aperture 330, for each photosensor array 320. This configuration alleviates the affects of position tolerance, or misalignment. In particular, the multiple optical elements 310a-1 to 310a-5 provide overlapping images derived from the scattered illumination spot 390 passing through each so that the matched photosensor array 320a is adequately covered with light. Thus, the pixels 420 of the photosensor array 320a can detect the image of the illumination spot 390 even with a worst case misalignment of the optical elements 310 and the photosensor arrays 320a because the photosensor array 320a is entirely exposed by a speckle image field generated through any of the multiple optical elements 310a-1 to 310a-5.

To lower computational load, and thus lower power consumption, for determining displacement of the optical pointing device 110, a multi-resolution system is used in accordance with the present invention. FIG. 5a diagramatically illustrates the optical assembly 260 configuration that can be used in either a single resolution or multi-resolution environment. For a multi-resolution environment, there will be at least two sets of optical elements 310 configured as described above.

Figure 5B:
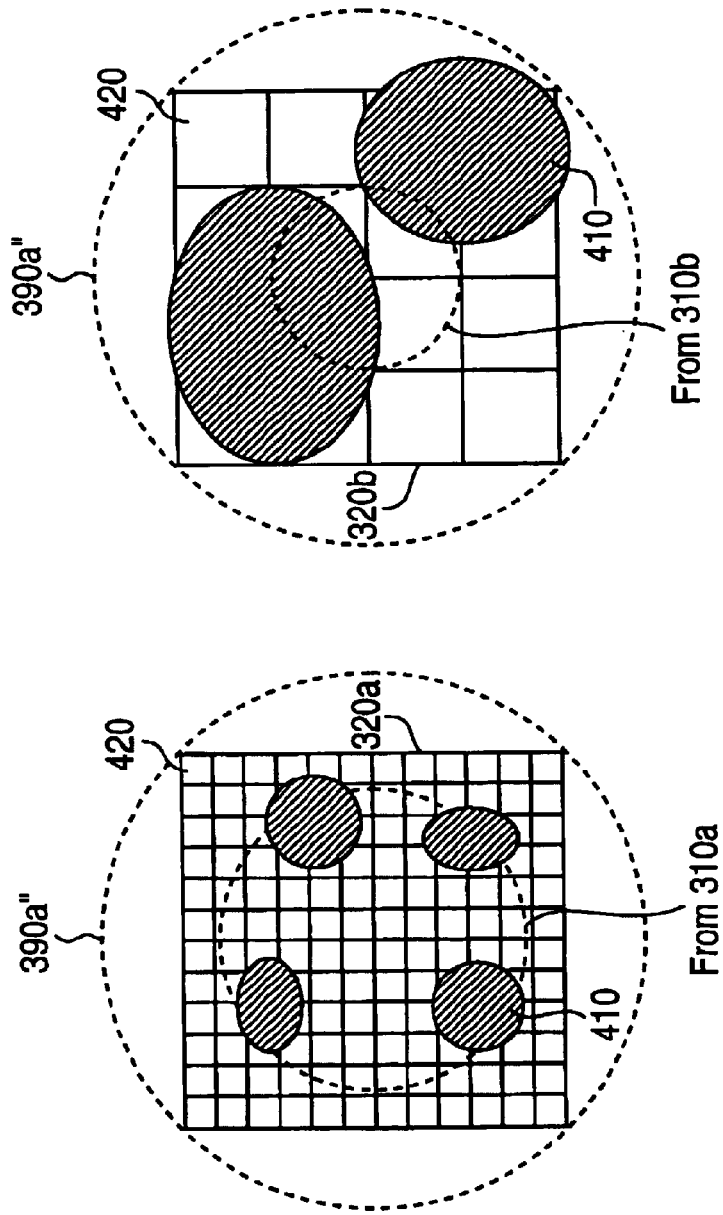
FIG. 5b is a symbolic view illustrating multi-resolution capabilities of the optical sensing assembly in accordance with the present invention.

FIG. 5b illustrates a multi-resolution environment through a symbolic view of speckle images 410 in accordance with the present invention. To achieve multi-resolution capabilities, the optical sensing assembly 260 includes a multi-element setup. In the multi-element setup, different optical elements 310a, 310b, each having a different artificially limited aperture, AP, 330a, 330b and different photosensor arrays 320a, 320b, each having a different pitch, $\Lambda$, are used to capture a plurality of speckle images 410.

The different artificially limited apertures 330a, 330b create speckle images 410 of different sizes. For example, a large aperture creates a smaller speckle image as illustrated with the second photosensor 320b. By contrast, a small aperture creates a larger speckle image as illustrated with the first photosensor 320a. The photosensor arrays 320a, 320b capture these speckle images 410. To achieve unambiguous data signals to detect movement, each of the optical elements 310a, 310b must be optically matched with one of the photosensor arrays 320a, 320b in the optical sensing assembly 260.

In a preferred embodiment each optical element 310a, 310b is associated with a photosensor array 320a, 320b by matching the speckle image size resulting from the artificially limited aperture 330a, 330b with a proper photosensor pitch so that an average diameter of a speckle is larger than one pixel 420. For example, an optical element 310a having a large aperture 330a is matched with a photosensor array 320a having smaller pixels and thus, a smaller pitch, $\Lambda$, as shown in FIG. 5b, to produce a high resolution speckle image data signal. By contrast, an optical element 310b having a small aperture 330b is matched with a photosensor array 320b having larger pixels and thus, larger pitch, $\Lambda$, between pixels, as shown in FIG. 5b, to produce a low resolution speckle image data signal. The resulting plurality of speckle images 410 of different sizes and resolution among different photosensor arrays 320a, 320b, forms a multi-resolution set of images that is a result of the fan-out from the diffusely reflected illumination spot 390 after passing through the optical elements 310 as described above. As will be described below, the multi-resolution architecture requires less power consumption as computational loads are significantly decreased.

Figure 6:
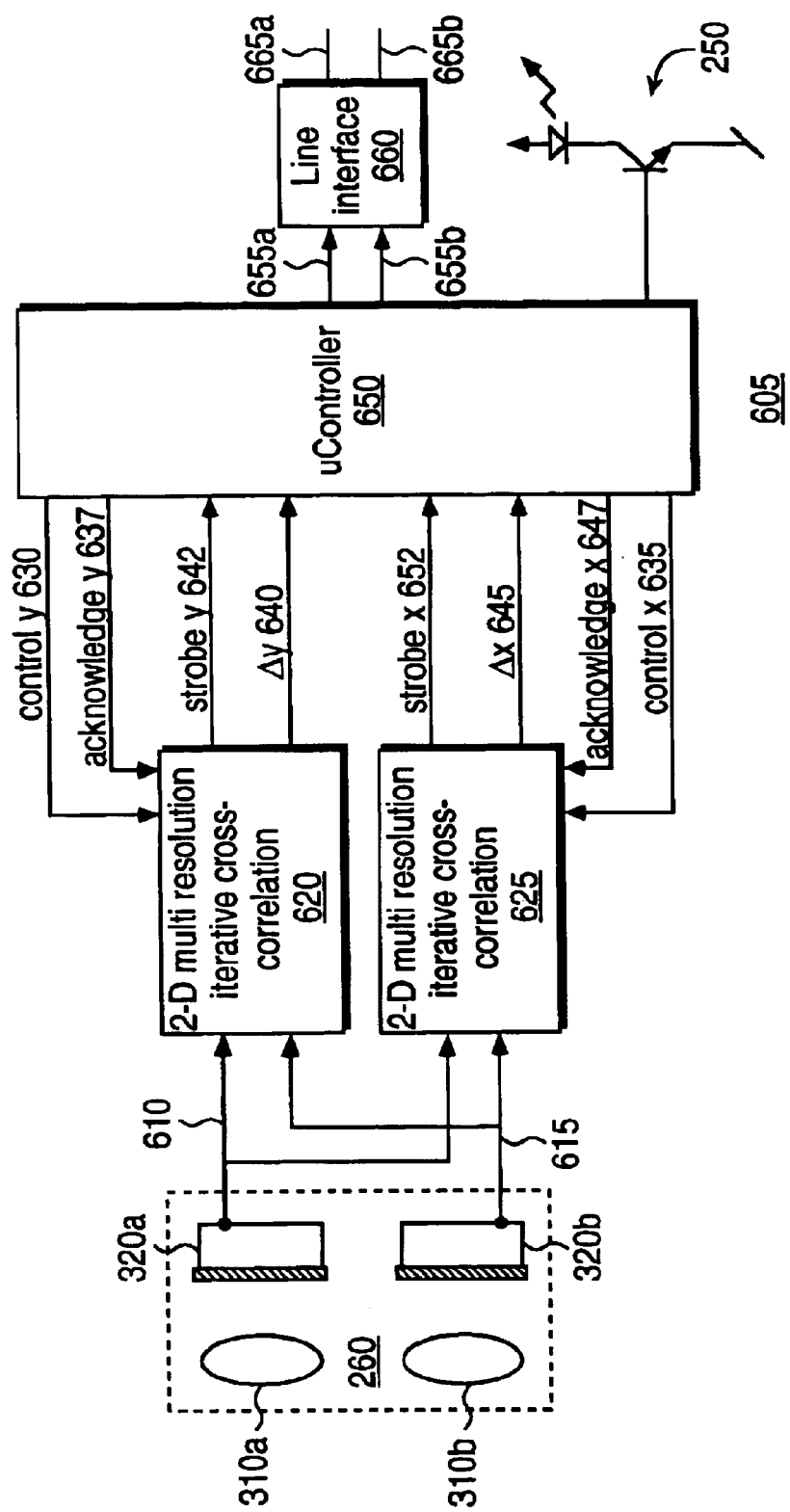
FIG. 6 is a block diagram illustrating a multi-resolution displacement detection system in accordance with the present invention.

FIG. 6 is a block diagram illustrating the multi-resolution displacement detection system 605, including the optical sensing assembly 260, in accordance with the present invention. The multi-resolution detection system 605 obtains the multi-resolution architecture of speckle images as discussed above and determines a two-dimensional displacement of the optical pointing device 110 as further described below.

The multi-resolution detection system 605 includes the coherent light source 250, the optical sensing assembly 260, a first low-resolution data signal line 610, a second high-resolution image data signal line 615, a two-dimensional ("2-D") y-direction cross-correlation module 620, a two-dimensional ("2-D") x-direction cross-correlation module 625, a y-control line 630, a x-control line 635, a y-change line 640, a x-change line 645, a y-acknowledge line 637, a x-acknowledge line 647, a y-strobe line 642, a x-strobe line 652, a microcontroller 650, a first and a second microcontroller output line 655a, 655b, a line interface module 660, a first line interface output line 665a, and a second line interface output line 665b.

The y-change line 640 and the x-change line 645 are in one embodiment 8-bit bus lines so that the signals along those lines, $\Delta y$ signal and $\Delta x$ signal, respectively, can be any integer between −127 and +127. The 2-D y-direction and the 2-D x-direction cross-correlation modules 620, 625 include a memory, or storage, element. In an alternative embodiment, the 2-D y-direction and the 2-D x-direction cross-correlation modules 620, 625 may be substituted with a general motion detection system.

A first photosensor 320a and a second photosensor 320b of the optical sensing assembly 260 are coupled to both the 2-D y-direction cross-correlation module 620 and the 2-D x-direction cross-correlation module 625 through the first and the second image data signal line 610, 615, respectively. The 2-D y-direction cross-correlation module 620 is coupled to the microcontroller 650 through the y-control line 630, the y-change line 640, the y-acknowledge line 637, and the y-strobe line 642. The 2-D x-direction cross-correlation module 625 is coupled to the microcontroller 650 through the x-control line 635; the x-change line 645, the x-acknowledge line 647, and the x-strobe line 652. The microcontroller 650 is coupled to the coherent light source 250, such as a laser diode. The microcontroller 650 is also coupled to the line interface 660 through the first and the second microcontroller output lines 655a, 655b. The output from the line interface 660 is a standard communication protocol, such as a serial port communication protocol or a universal serial bus protocol, for example. It is noted that the photosensor arrays 320, microcontroller 650, and cross-correlation modules 620, 625 may be integrated on a single complementary metal oxide semiconductor integrated circuit using a conventional digital signal processing ("DSP") core. In an alternative embodiment, these elements may be built using discrete integrated circuits such as a microcontroller or DSP chips, for example.

Figure 7A:
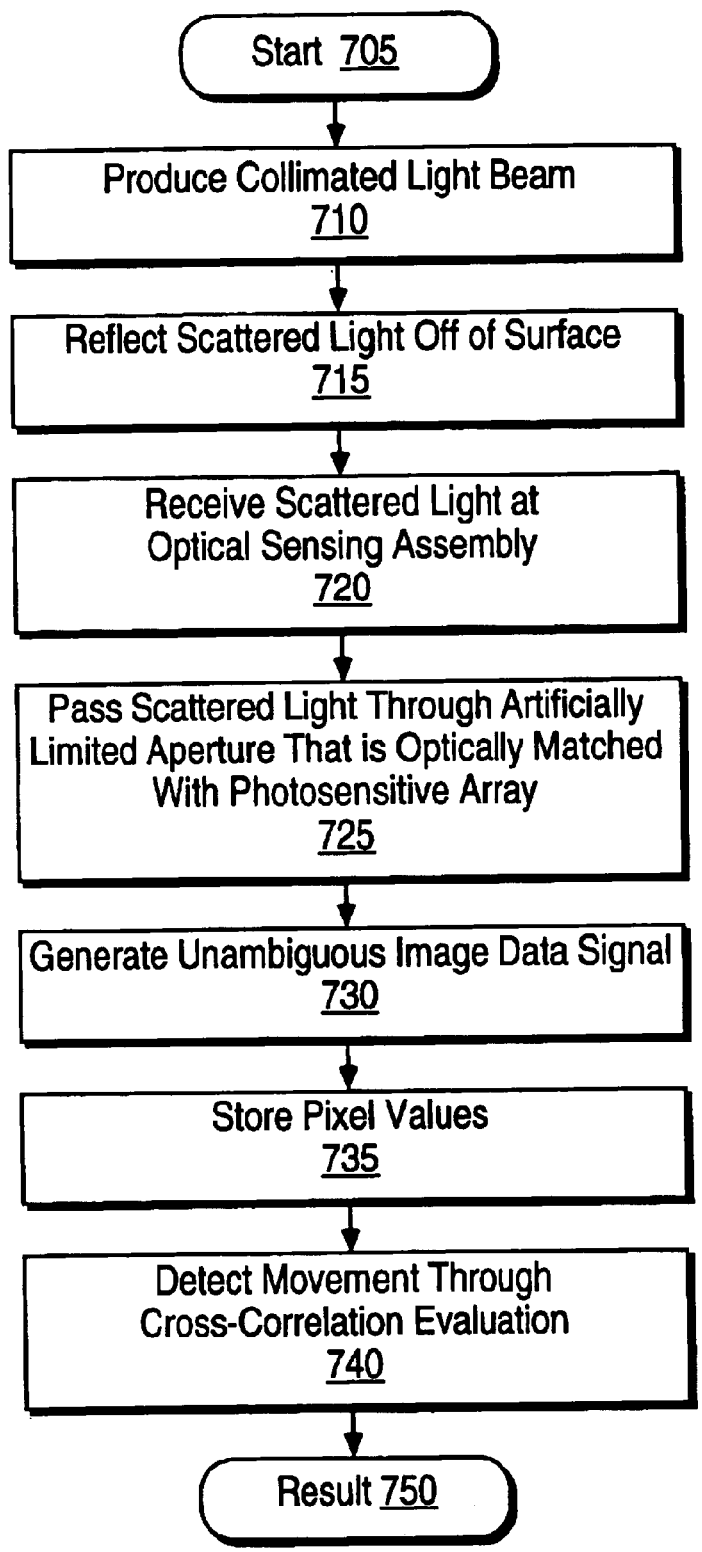
FIG. 7a is a flow diagram illustrating operation of the multi-resolution displacement detection system in accordance with the present invention.

FIG. 7a illustrates the operation of the multi-resolution displacement detection system 605 in accordance with the preferred embodiment of the present invention. The process starts 705 when the collimated beam 305 is produced 710 from the coherent light source 250 of the optical pointing device 130. The collimated beam 305 is scattered 715 off of the surface 120. The scattered light, is received 720 by the optical sensing assembly 260 so that it is fanned-out 725 through the lenses 315a, 315b and artificially limited apertures 330a, 330b of the optical elements 310a, 310b to ultimately generate a speckle image on the appropriate photosensor array 320a, 320b. The optical elements 310a, 310b having the artificially limited apertures 330a, 330b are optically matched with an associated photosensor array 320a, 320b so that the reflected illumination spot passing 725 through the artificially limited apertures 330a, 330b produces speckle images on the photosensor arrays 320a, 320b that have an average diameter at least equal to one pixel 420 of the associated photosensor array 320a, 320b.

Using optical matching with the pixel values from the image speckle, an unambiguous image data signal is generated 730. The image data signal is the collection of all pixel values that are generated by the photosensor array 320a, 320b. When a speckle image is received, a conversion from a light intensity of the speckle image to a voltage value which represents the pixel value is accomplished through a conventional charge coupled device ("CCD") or a photodiode system. An image data signal is then generated 730 as the sequential readout of all the pixel values, for example. A pixel clock signal (not shown) is used for pixel value synchronization to indicate when the image data signal should be acquired as the pixel values are sequentially output from the photosensor arrays 320a, 320b.

The newly received, or current, unambiguous image data signal is stored 735 in the memory, or storage medium, of the cross-correlation modules 620, 625. Using a previously obtained unambiguous image data signal that serves as a reference image data signal and the current unambiguous image data signal, the 2-D y-direction cross-correlation module 620 and the 2-D x-direction cross-correlation module 625 perform a cross-correlation analysis with unambiguous image data signals for the y-direction and the x-direction, respectively.

The 2-D x-direction and 2-D y-direction cross-correlation modules 620, 625 are typically implemented using a digital signal processor core. Each cross-correlation module 620, 625 performs a cross-correlation analysis only over a limited set of image signal points, which comprises the search range, by calculating a cross-correlation function and determining the peak value of the function by following an iterative search path.

Cross-correlation is a measure of the similarity between a reference image and an unknown image. For example, a large cross-correlation may mean there is a high degree of similarity between the reference image and the unknown image. A cross-correlation function provides the same measure of similarity, but computed for the reference image and the unknown image to which a displacement, a shift of (m, n), has been applied. The shift (m, n) provides an argument for the cross-correlation function.

If the cross correlation function is maximal for $m=m_o$ and $n=n_o$, it means that the displaced, or shifted, image most similar to the reference image is the unknown image to which a displacement ($m_o$, $n_o$) has been applied. Equivalently, if a pattern is recorded at two instants, and an unknown movement occurred between the two instants, the displacement can be deduced by finding the argument of the cross-correlation function where the peak is found. For example, assuming that the current image data signal is $f(x, y)$ and the reference image data signal is $g(x, y)$, the cross-correlation function $R(m, n)$ calculated for a displacement, $(m, n)$, is $R(m, n)=\Sigma_x\Sigma_y f(x, y) g(x-m, y-n)$. The estimated displacement, $\Delta x$ and $\Delta y$, is then found by determining where the peak of $R(m, n)$ occurs in the search range such that $R(\Delta x, \Delta y)=\text{Max}(R(m, n))$ with $(m, n)\in$ search range.

The peaks of the cross-correlation function provide the points, $\Delta x$ and $\Delta y$, respectively, that determine the two-dimensional displacement of a speckle image that occurred since the last refresh, e.g., when the current reference set of image data signals was transferred from the current image in the memory of the 2-D y-direction and 2-D x-direction cross-correlation modules 620, 625. Displacement. $\Delta x$ and $\Delta y$, respectively, is transferred as a signal from the x-direction cross correlation module 625 and the y-direction cross correlation module 620, respectively, to the microcontroller 650 through the y-change and x-change lines 640, 645.

The 2-D x-direction and 2-D y-direction cross-correlation modules 625, 620 perform a two-dimensional cross-correlation analysis because a speckle image appears in both the x-direction and the y-direction on each photosensor array 320a, 320b. In particular, the 2-D x-direction and 2-D y-direction cross-correlation modules 625, 620 have a different reference image data signal for cross-correlation computation depending on the detected displacement over an x- or a y-direction. The iterative search path cross-correlation analysis significantly reduces the number of operations when compared to an exhaustive search by conducting the search only over a limited search range.

In one embodiment, multi-resolution displacement detection includes the 2-D x-direction and 2-D y-direction cross-correlation modules 625, 620 performing the cross-correlation analysis that is separately dedicated to the x-direction and the y-direction, while the optical sensing assembly 260 is common for both directions. FIG. 7b (1–3) is a flow diagram illustrating operation of the 2-D cross-correlation modules 625, 620 and the microcontroller 650 in accordance with the present invention. For purposes of simplicity, the flow diagram will be discussed with respect to the 2-D x-direction cross-correlation module 625 and it is understood that similar principles apply for the 2-D y-direction cross-correlation module 620. Each instance when a new speckle image is acquired, a new set of image data signals for low-resolution, $\text{NewL}(x, y)$, and for high-resolution, $\text{NewH}(x, y)$, is acquired and stored into a memory. Thus, the memory stores two reference sets of image data signals, one for the x-direction and one for the y-direction, both of which are obtained from the previously acquired set of image data signals for low resolution, $\text{RefL1}(x, y)$, and for high-resolution, $\text{RefH1}(x, y)$.

The 2-D x-direction and 2-D y-direction cross-correlation modules 625, 620 of the multi-resolution displacement detection system 60 compute the cross-correlation function between the new set of image data signals and the corresponding reference set of image signals for both the x-direction and the y-direction. For example, at the start 770 of operation, low resolution data signals (from a first photosensor array 320a, for example) and high resolution data signals (from a second photosensor array 320b, for example) are read 772 from the photosensor arrays 320a, 320b. The data signals are converted 774 into digital values and stored 776 in memory as equivalent images, $\text{NewL}(x, y)$ and $\text{NewH}(x, y)$, to those captured on the photosensor arrays 320a, 320b.

For a displacement, $(m, n)$, a low resolution cross-correlation analysis $(\text{RL}(x, y))$ is computed 778, where $(m, n)\in[1 \ldots \text{Mx}, 1 \ldots \text{My}]$ and $\text{Mx}$ and $\text{My}$ are the number of pixels on the low resolution photosensor 320a along the x-direction and the y-direction. Thus, the cross-correlation function is $\text{RL}(m, n)=\Sigma_x\Sigma_y \text{NewL}(x, y) \text{RefL}(x-m, y-n)$, where $\text{RefL}$ is a current low-resolution reference image. Once the cross-correlation function is performed, peak values $(m_0, n_0)$ are identified 780 such that $\text{RL}(m_0, n_0)=\text{Max}(\text{RL}(m, n))$.

Once the peak values, $m_o$ and $n_o$, are identified 780, the search range $[((\text{LHR})^*(m_0))-\text{LHR} \ldots ((\text{LHR})^*(m_0))+\text{LHR}, ((\text{LHR})^*(n_0))-\text{LHR} \ldots ((\text{LHR})^*(n_0))+\text{LHR}]$ is defined 782, where LHR is the resolution ratio$=(\Lambda_H(\text{high resolution array}))/(\Lambda_L(\text{low resolution array}))$. For the displacement $(m, n)$ a high resolution cross correlation analysis $(\text{RH}(x, y))$ is computed 784 for $(m, n) \in$ search range, so that $\text{RH}(m, n)=\Sigma_x\Sigma_y \text{NewH}(x, y) \text{RefH}(x-m, y-n)$, where RefH is a high resolution current reference image. Once the cross-correlation function is performed, a peak value $(m_1, n_1)$ is identified 786 in the search range so that $\text{RH}(m_1, n_1)=\text{Max}(\text{RH}(m, n))$. A value for $m_1$ is forwarded 788 to the microcontroller 650 as a value $\Delta x$ through the x-change line 645 and the signal strobe_x is activated 790 by the x-direction cross correlation module 625.

The system determines 792 whether the microcontroller 650 activated an acknowledge_x signal. The acknowledge_x signal is sent to the 2-D x-direction cross correlation module 625. A control_x signal is read 794 by the 2-D x-direction cross correlation module 625 and, if activated 796, the reference image is refreshed 798 so that $\text{RefL1}(x, y)=\text{NewL}(x, y)$ and $\text{RefH1}(x, y)=\text{NewH}(x, y)$. Once the reference image is refreshed 798, the strobe_x signal is deactivated 800. If control_x is not activated, the system directly deactivates 800 the strobe_x signal.

The refresh includes transferring the current image data signal set into the reference image data signal set upon activation of the x-control 635 or y-control 630 by the microcontroller 650 using a technique as further described below. This technique is shown to effectively reduce any loss of sensitivity for low speed displacements either in the x-direction or the y-direction of an x-y plane while ensuring that the reference set of image signals is at least partly correlated with the new image set. Thus, the present invention beneficially eliminates a "snapping" effect and provides greater precision for determining displacement.

If a non-zero displacement is transmitted to the microcontroller 650 in the x-direction, and similarly in the y-direction, the new set of image signals becomes the reference set of image signals for the x-direction, and similarly for the y-direction, for use with the next set of image signal. The transfer of the new set of image data signals into the reference set of image memory in the x-direction and y-direction cross correlation modules 625, 620 is done upon activation of x_control or y_control signals, respectively, by the microcontroller 650. If a zero displacement is transmitted to the microcontroller 650 for any direction, the reference set of image signals is left unchanged, e.g., the x_control or y_control signals are not activated, for the particular direction unless the cumulative displacement, x_total and y_total, respectively, detected in the remaining direction corresponds to a sizable fraction, for example one-fourth, of the photosensor array. In such instances a refresh of the reference set of image data signals is performed using the current new set of image data signals.

Briefly, referring to the x-control 635 and the y-control 630 lines, the x-control line 635 will be described with the understanding that the similar principles apply for the y-control line 630. The microcontroller 650 activates the x_control signal along the x-control line 635 when the microcontroller 650 detects non-zero displacement along an x-direction, or when the cumulative displacement, y_total, since the last x-direction refresh along the y-direction is above a predetermined value, y_limit, such as an effective displacement equivalent to about one-fourth of the physical dimension of the photosensor array 320. This ensures that although there was no displacement along the x-direction since the last refresh, the displacement that occurred along y is not so big as to have moved all speckles 410 present on the reference set of images outside the field of view of the photosensor array 320. Activation of the x_control signal along the x-control line 635 means that the new set of image data signals become the reference set of image data, signals for the next set of image data signals. Specifically, the 2-D x-direction cross-correlation module 625 transfers the content of the memory, or portion thereof, that stores the new set of image data signals to the memory, or portion thereof, that stores the reference set of image data signals.

In addition, the microcontroller 650 acquires the displacement, Δx, as calculated by the 2-D x-direction cross-correlation module 625. The acquired value of the displacement, Δx, is the computed displacement since the last refresh, i.e., the change in the reference image data signal. The microcontroller 650 then keeps a cumulative displacement, x_total, that is equal to the current x_total value plus the displacement, Δx. Periodically, for example, every 20 milliseconds, the microcontroller 650 transmits x_total to the computer system 130 through the line interface 660 using a communication protocol such as a serial port communication protocol, universal serial bus communication protocol, or an IBM PS2™ mouse port communication protocol, for example. Once the x_total is transmitted to the computer system 130, x_total is reset to zero to begin accumulating a new displacement value as is further illustrated in FIG. 7c.

It is noted that if desired, the cross-correlation analysis can be iteratively applied to even higher resolution until a desired precision of displacement is reached. The number of operations, that is, the number of cross-correlation function evaluations, needed to reach a desired precision is reduced significantly by searching the cross-correlation function only over a limited number of points by following the iterative search path.

Figure 8:
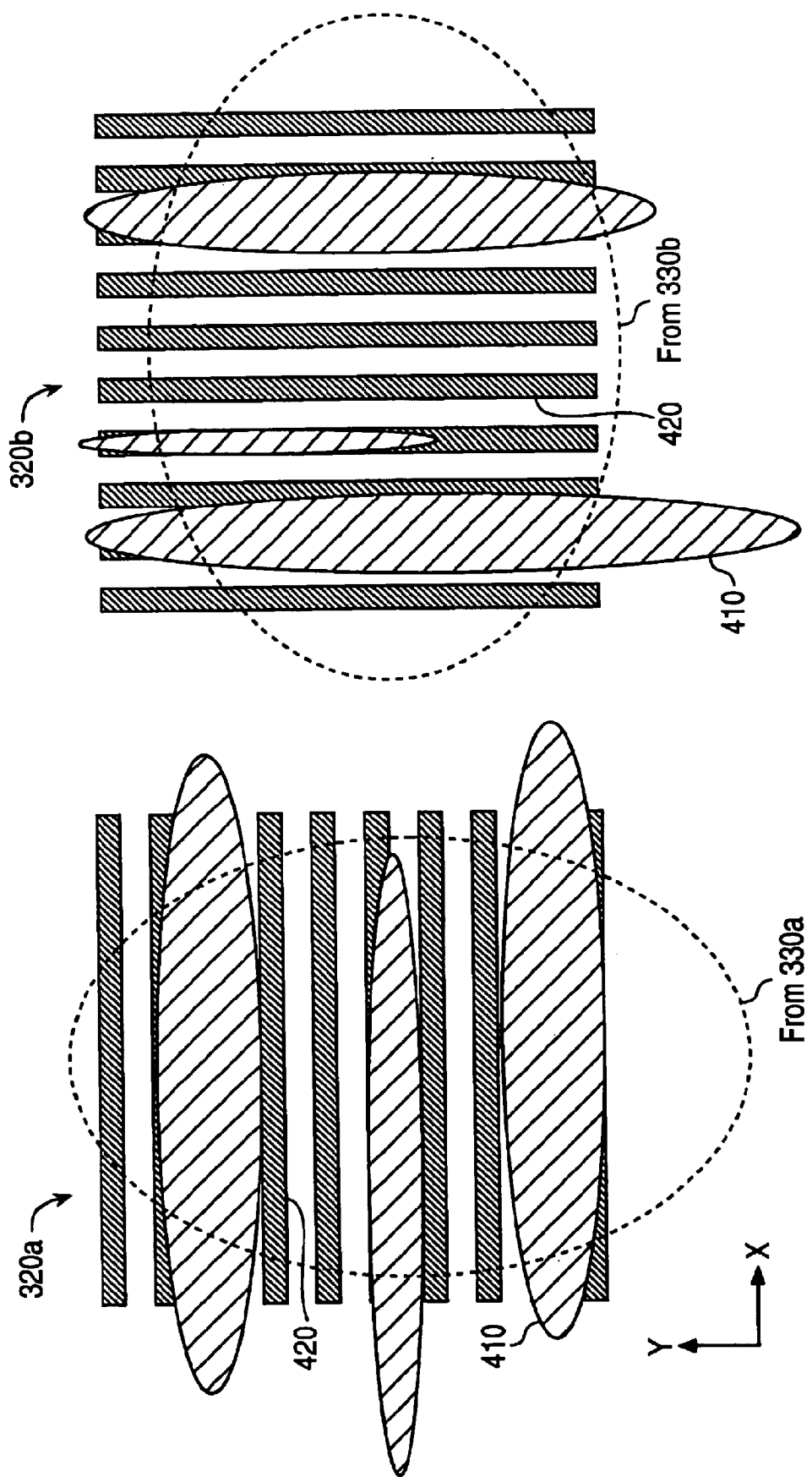
FIG. 8 is a symbolic view illustrating the artificially limited and anisotropic aperture in accordance with the present invention.

To achieve even greater computational power consumption savings, the optical elements may include artificially limited anisotropic apertures that are optically matched with associated photosensor arrays having a pitch, or periodicity, Λ, that is different for the x-direction and the y-direction so that a one-dimensional cross-correlation analysis may be performed. FIG. 8 is a symbolic view illustrating speckles captured on photosensor arrays 320 having a pitch that is different in the x-direction versus the y-direction and which are optically matched with an associated optical element having the artificially limited anisotropic aperture in accordance with the present invention.

Artificially limiting the aperture anisotropically generates elongated speckles in the direction of the largest periodicity, Λ, where periodicity, or pitch, is the distance between two neighboring pixels, as described above. For example, looking at the symbolic view in FIG. 8, when the largest periodicity is in the x-direction, as with the first photosensor array 320a, x-direction elongated speckles are generated so that the system is sensitive to movement in the y-direction. Similarly, when the largest periodicity is in the y-direction, as with the second photosensor array 320b, y-direction elongated speckles are generated so that the system is sensitive to movement in the x-direction. In a preferred embodiment, each photosensor a=ay 320 is comprised of M adjacent rectangular pixels 420 having a rectangular pixel shape of aspect ratio, N, where N is the ratio of the pixel length over the pixel width. When M equals N, the configuration produces square photosensor arrays 320.

Figure 9:
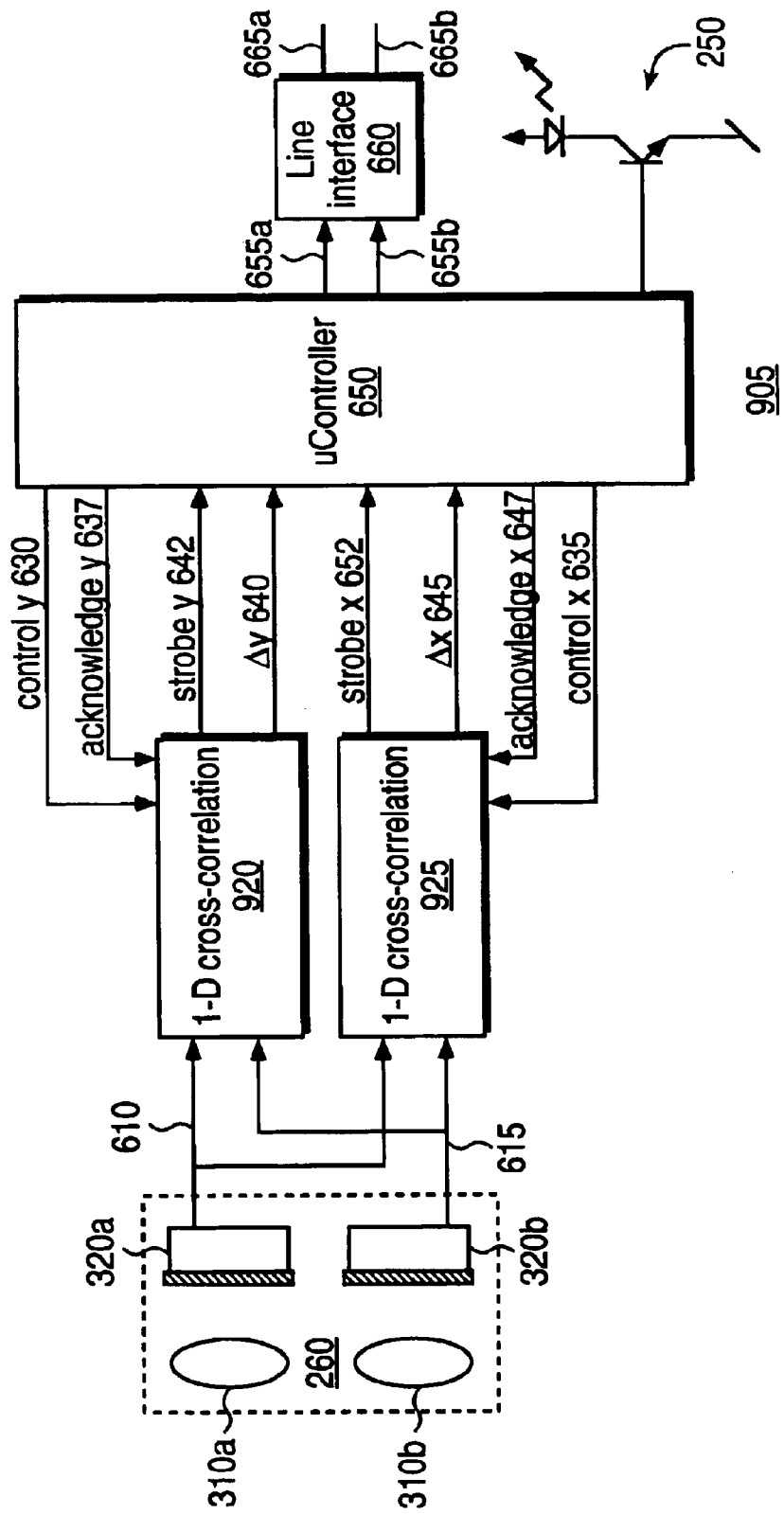
FIG. 9 is a block diagram illustrating an anisotropic motion detection system in accordance with the present invention.

FIG. 9 is a block diagram illustrating an anisotropic displacement detection system 905 in accordance with the present invention. Similar to the multi-resolution displacement detection system 605 in FIG. 6, the anisotropic optical displacement detection system 905 includes the coherent light source 250, the optical sensing assembly 260, a first image data signal line 610, a second image data signal line 615, a 1-dimensional ("1-D") y-direction cross-correlation module 920, a 1-dimensional ("1-D") x-direction cross-correlation module 925, the y-control line 630, the x-control line 635, the y-change line 640, the x-change line 645, the y-acknowledge line 637, the x-acknowledge line 647, the y-strobe line 642, the x-strobe line 652, the microcontroller 650, the first and the second microcontroller output line 655a, 655b, the line interface module 660, and the first and the second line interface output line 665a, 665b. Both the 1-D y-direction and the 1-D x-direction cross-correlation modules 920, 925 include a memory, or storage element.

A first photosensor 320a and a second photosensor 320b of the optical sensing assembly 260 are respectively coupled to the 1-D y-direction cross-correlation module 920 and the 1-D x-direction cross-correlation module 925 respectively through the first and the second image data signal line 610, 615. The 1-D y-direction cross-correlation module 920 is coupled to the microcontroller 650 through the y-control line 630, the y-change line 640, the y-acknowledge line 637, and the y-strobe line 642. The 1-D x-direction cross-correlation module 925 is coupled to the microcontroller 650 through the x-control line 635, the x-change line 645, the x-acknowledge line 647, and the x-strobe line 652. The microcontroller 650 is coupled to the coherent light source 250, such as a laser diode. The microcontroller 650 is also coupled to the line interface 660 through the first and the second microcontroller output lines 655a, 655b.

Similar to the multi-resolution displacement detection system 605, the optical pointing device 130 of the present invention having an anisotropic displacement detection system produces a collimated beam 305 from the coherent light source 250. The collimated beam 305 is diffusely reflected, i.e., scattered, off of the surface 120. The scattered light is received by the optical sensing assembly 260 so that it is fanned-out through the lenses 315a, 315b and artificially limited anisotropic apertures 330a, 330b of the optical elements 310a, 310b to generate speckle images on the associated photosensor arrays 320a, 320b.

The optical elements 310 having the artificially limited anisotropic apertures 330a, 330b are optically matched with an associated photosensor array 320a, 320b, having (M×1) and (1×M) pixels respectively, and having an aspect ratio of N. The aspect ratio. N, is an elongation factor comprising the average speckle length over the average speckle width. Optical matching in such instances implies that the ratio of the long aperture to the small aperture is also N. In a preferred embodiment, the number of elongated pixels. M, is at least two and is made equal to N, which yields an overall square photosensor array 320. Thus, the speckle images generated by the artificially limited anisotropic apertures 330a, 330b comprise elongated speckles on the associated photosensor arrays 320a, 320b.

Using optical matching with the pixel values from the image speckle, an unambiguous image data signal is generated because a single elongated speckle will cover on average a single elongated pixel. To obtain the image data signal for the 1-D cross-correlation analysis, the light intensity of a speckle image captured on a photosensor array 320a, 320b is converted to a voltage value representing a pixel value. The voltage, or pixel, value represents the intensity of the light applied to each pixel 420 and is based on a conventional charge coupled device, a photogate system, or a photodiode. The image data signal that is produced is an unambiguous image data signal that is a sequential readout of all the pixel values, for example. It is noted that although a pixel clock is not shown, it is present for pixel value synchronization to indicate when the image data signal should be acquired as pixel values are sequentially output from the photosensor arrays 320a, 320b.

The unambiguous image data signal is stored in the memory, or storage medium, cross-correlation module 920, 925. Using a previous, or reference, unambiguous image data signal and the newly received unambiguous image data signal, the 1-D y-direction cross-correlation module 920 and the 1-D x-direction cross-correlation module 925 perform a cross-correlation analysis with unambiguous image data signals for the y-direction and the x-direction, respectively.

The anisotropic configuration performs a cross-correlation analysis in one dimension—along the direction perpendicular to the elongated speckle images. The effects of lateral motion from the other direction is minimized because the speckles are elongated in that direction, thus, producing little change in the image data signal as long as lateral displacement is smaller than about one-fourth of the largest dimension of a pixel 420. The use of a one dimensional cross-correlation analysis produces significant power savings because computations to determine a displacement occur in only one dimension and therefore, further reduce the number of operations required to determine the displacement of the optical pointing device 130.

Figure 10:
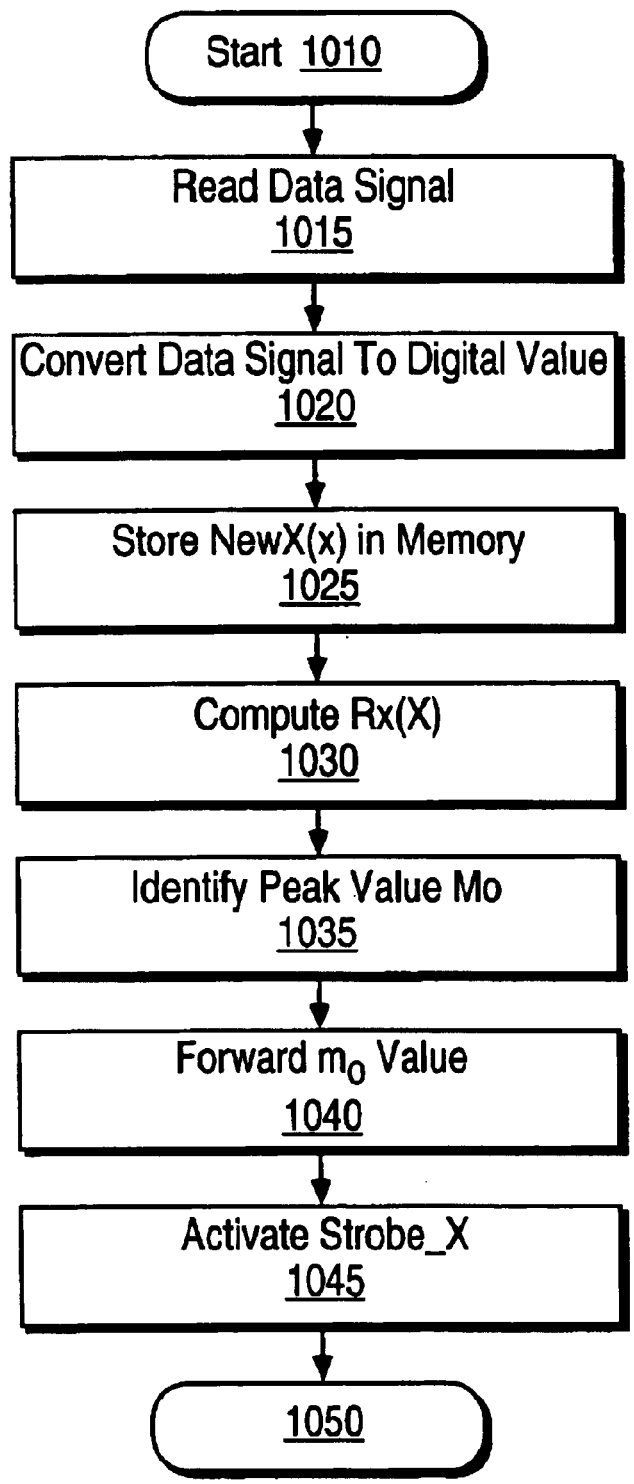
FIG. 10 is a flow diagram illustrating operation of a 1-D cross-correlation module in accordance with the present invention.
Figure 10:
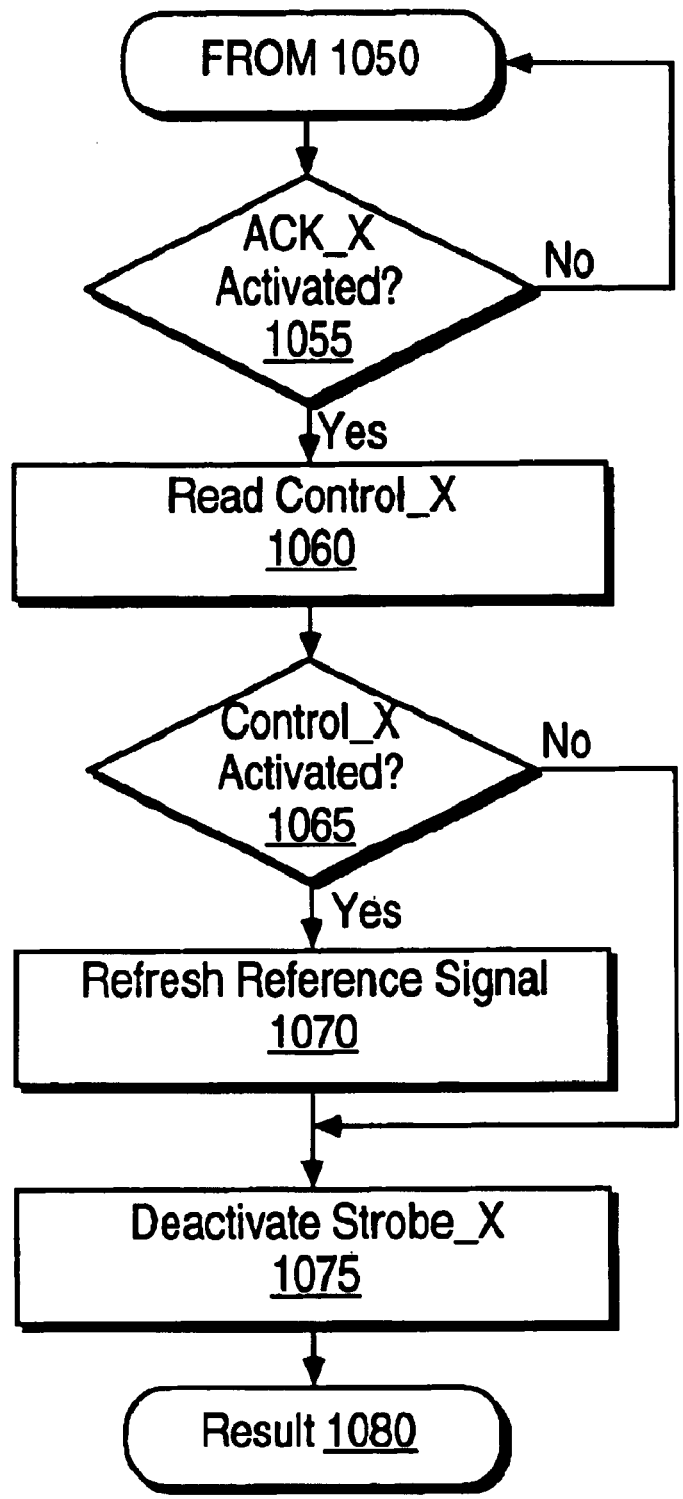

FIG. 10 is a flow diagram illustrating a 1-D cross-correlation analysis. FIG. 10 is described with reference to the 1-D x-direction cross-correlation module 925. It is understood that the 1-D y-direction cross-correlation module 920 functions equivalently for the y-direction. The process starts 1010 with a current reference image, RefX(x), in the system obtained from the original location of the optical pointing device 130. The new image data signal that is received as a result of a movement of the optical pointing device 130 is transmitted along the second image data line 615 and read 1015 by the 1-D x-direction cross-correlation module 925. The 1-D x-direction cross-correlation module 925 converts 1020 the image data signal into digital values. The converted data signal is stored 1025 in the memory of the 1-D x-direction cross-correlation module 925 as NewX(x), which is equivalent to the image data signal, but in a digital matrix form.

For all $x \in [1 \ldots M_x]$, where $M_x$ is the number of pixels on the photosensor 320b, the process computes 1030 $R_x(m)$ such that $R_x(m)=\Sigma_x(NewX(x))(RefX(x-m))$. The process then identifies 1035 the peak value $m_o$ such that $R_x(m_o)=$ Max(Rx(m)). After the peak value has been identified 1035, the process forwards the value $m_o$ to the microcontroller 650 at the value $\Delta x$ along the x-change line 645. The 1-D x-direction cross-correlation module 925 activates 1045 a signal strobe_x that is sent to the microcontroller 650 over the x-strobe line 652. The microcontroller 650 acknowledges the receipt of the value $\Delta x$ and activates a signal of acknowledge_x. If the acknowledge_x signal is activated 1055 the control_x signal is read 1060 by the 1-D x-direction cross-correlation module 925. If the 1-D x-direction cross-correlation module determines 1065 that the control_x signal is active, it refreshes 1070 the reference signal, RefX(x), such that RefX(x)=NewX(x). After the refresh 1070 is completed, the strobe_x signal is deactivated.

If there is a non-zero displacement in the x-direction or the y-direction, a current unidimensional x-direction set of image signals and a current unidimensional y-direction set of image signals, respectively, become a reference set of image signals for the x-direction and the y-direction, respectively. The transfer of the new set of image data signals into the memory of the 1-D cross-correlation module 925, 920 holding the reference set of image data signals occurs after activation of the x-control 635 or the y-control 630 accordingly. The x-control 635 and y-control 630 function as described above with respect to FIGS. 6 and 7.

If there is a zero displacement for any direction, the reference set of images is left unchanged for this direction unless the cumulative displacement detected in the other direction corresponds to a sizable fraction. e.g., one-fourth, of the photosensor array. If there is a sizable fraction, a refresh of the reference image signal is performed using a new, current, image signal. The refresh process is similar to that described above in FIGS. 6 and 7. This technique effectively reduces any loss of sensitivity for low-speed displacements either in the x-direction or the y-direction, while ensuring the reference image signal to be at least partly correlated with the new image signal. In addition, as discussed above, the "snapping" effect is also reduced to further increase displacement accuracy.

The present invention beneficially provides for an optical pointing device that has few, if any, mechanical moving parts. The present invention is advantageously capable of operating on a surface capable of diffusely scattering a collimated beam 305 from a light source having a coherent light component so that a diffusely reflected image of the collimated beam 305 can be received by the optical sensing assembly 260. Moreover, the optical sensing assembly 260 provides optically matched optical elements 310a, 310b and photosensor arrays 320a, 320b that allow for speckle images that are generated by passing the diffusely scattered image of the illumination spot 390 through the optical elements 310 to be captured and utilized for determining displacement detection for an optical pointing device 130. In addition, the present invention advantageously provides for 1-D as well as 2-D cross-correlation analysis to determine displacement thereby beneficially reducing computational workloads and reducing overall power consumption.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In an optical detection system housing a coherent light source for illuminating a surface, and an optical sensing assembly comprising at least one photosensitive array and at least one optical element, a method for detecting movement comprising:

generating an illumination spot on the surface by lighting the surface with a coherent light beam from the coherent light source, the illumination spot providing optically back-scattered light off the surface;

arranging each optical element to pass an image of the illumination spot onto each photosensor array associated with an optical element, the photosensor array having a plurality of pixels; and generating at least one image data signal from each photosensor array in response to the image on the plurality of pixels of that photosensor array, each image data signal comprising at least one image data point;

storing a first image data signal and a second image data signal, the first image data signal comprises a first substantially random image data signal and the second image data signal comprises a second substantially random image data signal; and measuring similarility of images through the first image data signal and the second image data signal to obtain a displacement value, the displacement value indicative of detected movement, the similarity of the first image data signal to the second image data signal is measured at a multiple of a shift value, the first image data signal being shifted by a predetermined shift value prior to the measurement.

2. The method of claim 1, wherein the first image data signal is stored in a first portion of a memory unit and the second image data signal is stored in a second portion of the memory unit.

3. The method of claim 1, wherein the first image data signal is stored in a first portion of a memory unit at a start of operation of the optical detection system and the second image data signal is stored in a second portion of a memory unit for each set of measurements of the similarity of images.

4. The method of claim 1, wherein the second image data signal is substantially a shifted version of the first image data signal.

5. The method of claim 1, wherein the first image data signal comprises a first speckle image data signal and the second image data signal comprises a second speckle image data signal.

6. The method of claim 5, wherein the speckle image associated with at least one of the first speckle image data signal and the second speckle image data signal comprises speckles of a dimension greater than or equal to a pixel dimension.

7. The method of claim 1, wherein the similarity of at least two image data signals is based on each image data comprising a set and is measured at a multiple of a shift value, each set comprising a high resolution and a low resolution image data signal, and the image data signal in a first set being shifted by a predetermined shift value prior to the measurement.

8. The method of claim 1, wherein measuring the similarity is performed through an application of a cross correlation function.

9. The method of claim 8, wherein performing the cross correlation function further comprises:

multiplying the first image data signal and the second image data signal and summing results of each multiplication operation over each data point.

10. The method of claim 9, wherein the cross correlation of the first image data signal to the second image data signal is measured at a multiplicity of a shift value, the first image data signal being shifted by a predetermined shift value before the cross correlation is measured.

11. The method of claim 10, wherein the displacement value comprises identifying the shift to apply to the first image data signal that results in a substantial cross correlation between the first image shifted by the displacement value and the second image.

12. The method of claim 1, wherein the displacement value comprises identifying a shift to apply to the first image data signal that results in a substantial similarity between the first image shifted by the displacement value and the second image.

13. The method of claim 1, wherein the first image data signal is replaced by the second image data when a displacement value comprises a predetermined value.

14. The method of claim 1, wherein the at least one optical element comprises a lens.

15. The method of claim 1, wherein the at least one optical element comprises a lens and an aperture.

16. The method of claim 1, wherein the coherent light beam from the coherent light source comprises a collimated beam.

17. The method of claim 16, wherein the collimated beam produces the illumination spot on the surface.

18. The method of claim 1, wherein the light source comprises a laser diode.

19. The method of claim 1, wherein the back-scattered light from the surface, passes through the at least one optical element to generate an image of the illumination spot on the pixels of the at least one photosensor array.

20. The method of claim 19, wherein the image is focused on the photosensor array.

21. The method of claim 1, wherein the back-scattered light from the surface, passes through the at least one optical element to generate an image of the illumination spot that is less than or equal to a size of the photosensor array.

22. In an optical detection system housing a coherent light source for illuminating a surface, and an optical sensing assembly comprising at least one photosensitive array and at least one optical element, a method for detecting movement comprising:

generating an illumination spot on the surface by lighting the surface with a coherent light beam from the coherent light source, the illumination spot providing optically back-scattered light off the surface;

arranging each optical element to pass an image of the illumination spot onto each photosensor array associated with an optical element, the photosensor array having a plurality of pixels; and generating at least one image data signal from each photosensor array in response to the image on the plurality of pixels of that photosensor array, each image data signal comprising at least one image data point;

storing a first image data signal and a second image data signal, the second image data signal is substantially a shifted version of the first image data signal; and measuring similarility of images through the first image data signal and the second image data signal to obtain a displacement value, the displacement value indicative of detected movement, the similarity of the first image data signal to the second image data signal is measured at a multiple of a shift value, the first image data signal being shifted by a predetermined shift value prior to the measurement.

23. The method of claim 22, wherein the first image data signal is stored in a first portion of a memory unit and the second image data signal is stored in a second portion of the memory unit.

24. The method of claim 22, wherein the first image data signal is stored in a first portion of a memory unit at a start of operation of the optical detection system and the second image data signal is stored in a second portion of a memory unit for each set of measurements of the similarity of images.

25. The method of claim 22, wherein the first image data signal comprises a first substantially random image data signal and the second image data signal comprises a second substantially random image data signal.

26. The method of claim 22, wherein the similarity of the first image data signal to the second image data signal is measured at a multiple of a shift value, the second image data signal being shifted by a predetermined shift value prior to the measurement.

27. The method of claim 22, wherein the similarity of the first image data signal to the second image data signal is measured at a predetermined multiple of a shift value, the second image data signal being shifted by a predetermined shift value prior to the measurement.

28. The method of claim 22, wherein the similarity of at least two image data signals is based on each image data comprising a set and is measured at a multiple of a shift value, each set comprising a high resolution and a low resolution image data signal, and the image data signal in a first set being shifted by a predetermined shift value prior to the measurement.

29. The method of claim 22, wherein measuring the similarity is performed through an application of a cross correlation function.

30. The method of claim 29, wherein performing the cross correlation function further comprises:
multiplying the first image data signal and the second image data signal and summing results of each multiplication operation over each data point.

31. The method of claim 30, wherein the cross correlation of the first image data signal to the second image data signal is measured at a multiplicity of a shift value, the first image data signal being shifted by a predetermined shift value before the cross correlation is measured.

32. The method of claim 31, wherein the displacement value comprises identifying the shift to apply to the first image data signal that results in a substantial cross correlation between the first image shifted by the displacement value and the second image.

33. The method of claim 22, wherein the displacement value comprises identifying a shift to apply to the first image data signal that results in a substantial similarity between the first image shifted by the displacement value and the second image.

34. The method of claim 22, wherein the first image data signal is replaced by the second image data when a displacement value comprises a predetermined value.

35. The method of claim 22, wherein the at least one optical element comprises a lens.

36. The method of claim 22, wherein the at least one optical element comprises a lens and an aperture.

37. The method of claim 22, wherein the coherent light beam from the coherent light source comprises a collimated beam.

38. The method of claim 37, wherein the collimated beam produces the illumination spot on the surface.

39. The method of claim 22, wherein the light source comprises a laser diode.

40. The method of claim 22, wherein the back-scattered light from the surface, passes through the at least one optical element to generate an image of the illumination spot on the pixels of the at least one photosensor array.

41. The method of claim 22, wherein the back-scattered light from the surface, passes through the at least one optical element to generate an image of the illumination spot that is less than or equal to a size of the photosensor array.

42. The method of claim 41, wherein the image is focused on the photosensor array.

43. The method of claim 22, wherein the first image data signal comprises a first speckle image data signal and the second image data signal comprises a second speckle image data signal.

44. The method of claim 43, wherein the speckle image associated with at least one of the first speckle image data signal and the second speckle image data signal comprises speckles of a dimension greater than or equal to a pixel dimension.

45. In an optical detection system housing a coherent light source for illuminating a surface, and an optical sensing assembly comprising at least one photosensitive array and at least one optical element, a method for detecting movement comprising:
generating an illumination spot on the surface by lighting the surface with a coherent light beam from the coherent light source, the illumination spot providing optically back-scattered light off the surface;
arranging each optical element to pass an image of the illumination spot onto each photosensor array associated with an optical element, the photosensor array having a plurality of pixels; and
generating at least one image data signal from each photosensor array in response to the image on the plurality of pixels of that photosensor array, each image data signal comprising at least one image data point;
storing a first image data signal and a second image data signal, the first image data signal comprises a first speckle image data signal and the second image data signal comprises a second speckle image data signal; and
measuring similarility of images through the first image data signal and the second image data signal to obtain a displacement value, the displacement value indicative of detected movement, the similarity of the first image data signal to the second image data signal measured at a multiple of a shift value, the first image data signal being shifted by a predetermined shift value prior to the measurement.

46. The method of claim 45, wherein the first speckle image data signal is stored in a first portion of a memory unit and the second speckle image data signal is stored in a second portion of the memory unit.

47. The method of claim 45, wherein the first speckle image data signal is stored in a first portion of a memory unit at a start of operation of the optical detection system and the second speckle image data signal is stored in a second portion of a memory unit for each set of measurements of the similarity of images.

48. The method of claim 45, wherein the first speckle image data signal comprises a first substantially random image data signal and the second speckle image data signal comprises a second substantially random image data signal.

49. The method of claim 45, wherein the similarity of the first speckle image data signal to the second speckle image data signal is measured at a multiple of a shift value, the first speckle image data signal being shifted by a predetermined shift value prior to the measurement.

50. The method of claim 49, wherein the similarity of the first speckle image data signal to the second speckle image data signal is measured at a predetermined multiple of a shift value, the first speckle image data signal being shifted by a predetermined shift value prior to the measurement.

51. The method of claim 45, wherein the similarity of at least two speckle image data signals is measured at a multiple of a shift value, each set comprising a high resolution and a low resolution image data signal, and the speckle image data signal in the first set being shifted by a predetermined shift value prior to the measurement.

52. The method of claim 45, wherein measuring the similarity is performed through an application of a cross correlation function.

53. The method of claim 52, wherein performing the cross correlation function further comprises:
multiplying the first image data signal and the second image data signal and summing results of each multiplication operation over each data point.

54. The method of claim 53, wherein the cross correlation of the first speckle image data signal to the second speckle image data signal is measured at a multiplicity of a shift value, the first speckle image data signal being shifted by a predetermined shift value before the cross correlation is measured.

55. The method of claim 54, wherein the displacement value comprises identifying the shift to apply to the first image data signal that results in a substantial cross correlation between the first speckle image shifted by the displacement value and the second speckle image.

56. The method of claim 55, wherein the second speckle image data signal is substantially a shifted version of the first speckle image data signal.

57. The method of claim 45, wherein the displacement value comprises identifying a shift to apply to the first speckle image data signal that results in a substantial similarity between the first speckle image shifted by the displacement value and the second speckle image.

58. The method of claim 45, wherein the first speckle image data signal is replaced by the second speckle image data when a displacement value comprises a predetermined value.

59. The method of claim 45, wherein the at least one optical element comprises a lens.

60. The method of claim 45 wherein the at least one optical element comprises a lens and an aperture.

61. The method of claim 45, wherein the coherent light beam from the coherent light source comprises a collimated beam.

62. The method of claim 61, wherein the collimated beam produces the illumination spot on the surface.

63. The method of claim 45, wherein the light source comprises a laser diode.

64. The method of claim 45, wherein the back-scattered light from the surface, passes through the at least one optical element to generate an image of the illumination spot on the pixels of the at least one photosensor array.

65. The method of claim 64, wherein the image is focused on the photosensor array.

66. The method of claim 45, wherein the back-scattered light from the surface, passes through the at least one optical element to generate an image of the illumination spot that is less than or equal to a size of the photosensor array.

67. The method of claim 45, wherein a speckle image associated with at least one of the first speckle image data signal and the second speckle image data signal comprises speckles of a dimension greater than or equal to a pixel dimension.

68. The method of claim 45, wherein the second image data signal is substantially a shifted version of the first image data signal.

69. The method of claim 45, wherein the first image data signal comprises a first speckle image data signal and the second image data signal comprises a second speckle image data signal.

70. The method of claim 69, wherein the speckle image associated with at least one of the first speckle image data signal and the second speckle image data signal comprises speckles of a dimension greater than or equal to a pixel dimension.

71. The method of claim 45, wherein the similarity of the first image data signal to the second image data signal is measured at a multiple of a shift value, the first image data signal being shifted by a predetermined shift value prior to the measurement.

72. The method of claim 45, wherein the similarity of the first image data signal to the second image data signal is measured at a predetermined multiple of a shift value, the second image data signal being shifted by a shift value prior to the measurement.

73. The method of claim 45, wherein the similarity of the first image data signal to the second image data signal is measured at a multiple of a shift value, the second image data signal being shifted by a predetermined shift value prior to the measurement.

74. In an optical detection system housing a coherent light source for illuminating a surface, and an optical sensing assembly comprising at least one photosensitive array and at least one optical element, a method for detecting movement comprising:
generating an illumination spot on the surface by lighting the surface with a coherent light beam from the coherent light source, the illumination spot providing optically back-scattered light off the surface;
arranging each optical element to pass an image of the illumination spot onto each photosensor array associated with an optical element, the photosensor array having a plurality of pixels; and
generating at least one image data signal from each photosensor array in response to the image on the plurality of pixels of that photosensor array, each image data signal comprising at least one image data point;
storing a first image data signal in a first set and storing a second image data signal in a second set, each set comprising a high resolution and a low resolution image data signal, each image data signal representing a random image; and
measuring similarility of image data signals in the first set and the second set to obtain a displacement value, the displacement value indicative of detected movement, the similarity of at least two image data signals is measured at a multiple of a shift value, the image data signal in the first set being shifted by a predetermined shift value prior to the measurement.

75. The method of claim 74, wherein the first image data signal is stored in a first portion of a memory unit and the second image data signal is stored in a second portion of the memory unit.

76. The method of claim 74, wherein the first image data signal is stored in a first portion of a memory unit at a start of operation of the optical detection system and the second image data signal is stored in a second portion of a memory unit for each set of measurements of the similarity of images.

77. The method of claim 74, wherein measuring the similarity is performed through an application of a cross correlation function.

78. The method of claim 77, wherein performing the cross correlation function further comprises:
multiplying the first image data signal and the second image data signal and summing results of each multiplication operation over each data point.

79. The method of claim 78, wherein the cross correlation of the first image data signal to the second image data signal is measured at a multiplicity of a shift value, the first image data signal being shifted by a predetermined shift value before the cross correlation is measured.

80. The method of claim 79, wherein the displacement value comprises identifying the shift to apply to the first image data signal that results in a substantial cross correlation between the first image shifted by the displacement value and the second image.

81. The method of claim 74, wherein the displacement value comprises identifying a shift to apply to the first image data signal that results in a substantial similarity between the first image shifted by the displacement value and the second image.

82. The method of claim 74, wherein the first image data signal is replaced by the second image data when a displacement value comprises a predetermined value.

83. The method of claim 74, wherein the at least one optical element comprises a lens.

84. The method of claim 74, wherein the at least one optical element comprises a lens and an aperture.

85. The method of claim 74, wherein the coherent light beam from the coherent light source comprises a collimated beam.

86. The method of claim 85, wherein the collimated beam produces the illumination spot on the surface.

87. The method of claim 74, wherein the light source comprises a laser diode.

88. The method of claim 74, wherein the back-scattered light from the surface, passes through the at least one optical element to generate an image of the illumination spot on the pixels of the at least one photosensor array.

89. The method of claim 88, wherein the image is focused on the photosensor array.

90. The method of claim 74, wherein the back-scattered light from the surface, passes through the at least one optical element to generate an image of the illumination spot that is less than or equal to a size of the photosensor array.

91. In an optical detection system housing a coherent light source for illuminating a surface, and an optical sensing assembly comprising at least one photosensitive array and at least one optical element, a method for detecting movement comprising:

generating an illumination spot on the surface by lighting the surface with a coherent light beam from the coherent light source, the illumination spot providing optically back-scattered light off the surface;

arranging each optical element to pass an image of the illumination spot onto each photosensor array associated with an optical element, the photosensor array having a plurality of pixels; and generating at least one image data signal from each photosensor array in response to the image on the plurality of pixels of that photosensor array, each image data signal comprising at least one image data point;

storing a first image data signal and a second image data signal; and measuring similarility of images through the first image data signal and the second image data signal to obtain a displacement value, the displacement value indicative of detected movement, the similarity measured through application of a cross correlation function further comprising, multiplying the first image data signal and the second image data signal, and summing results of each multiplication operation over each data point.

92. The method of claim 91, wherein the cross correlation of the first image data signal to the second image data signal is measured at a multiplicity of a shift value, the first image data signal being shifted by a predetermined shift value before the cross correlation is measured.

93. The method of claim 92, wherein the displacement value comprises identifying the shift to apply to the first image data signal that results in a substantial cross correlation between the first image shifted by the displacement value and the second image.

94. The system of claim 93, wherein the first storage area comprises a first portion of a memory unit and the second storage area comprises a second portion of the memory unit.

95. The system of claim 93, wherein the first image data signal comprises a first substantially random image data signal and the second image data signal comprises a second substantially random image data signal.

96. The system of claim 95, wherein the comparison module comprises a cross correlation module.

97. The system of claim 96, wherein the similarity of one set to a plurality of at least two image data signals is measured at a multiple of a shift value, each set comprising a high resolution and a low resolution image data signal, and the image data signal in the first set being shifted by a predetermined shift value prior to the measurement.

98. The system of claim 96, wherein cross-correlation module applies the cross-correlation function on two sets of two image data signals, each set comprising a high resolution and a low resolution image data signals, and in each set, each of the image data signals being shifted at least a portion of a pixel on a photosensor array.

99. The system of claim 96, wherein the cross-correlation module is further configured to:

multiply the first image data signal and the second image data signal; and sum results of each multiplication operation.

100. The system of claim 93, wherein the second image data signal is substantially a shifted version of the first image data signal.

101. The system of claim 93, wherein the first image data signal comprises a first speckle image data signal and the second image data signal comprises a second speckle image data signal.

102. The system of claim 101, wherein the speckle image associated with at least one of the first speckle image data signal and the second speckle image data signal comprises speckles of a dimension greater than or equal to a dimension of a pixel of the pixels.

103. The system of claim 93, wherein the first image data signal comprises a first randomly patterned image data signal and the second image data signal comprises a second randomly patterned image data signal.

104. The system of claim 93, wherein the displacement value comprises an argument of the cross-correlation function at function peaks.

105. The system of claim 93, wherein the first image data signal is replaced by the second image data when the displacement value comprises a predetermined value.

106. The system of claim 93, wherein the at least one optical element comprises a lens.

107. The system of claim 93, wherein the at least one optical element comprises a lens and an aperture.

108. The system of claim 93, wherein the coherent light beam from the coherent light source comprises a collimated beam.

109. The system of claim 108, wherein the collimated beam produces the illumination spot on the surface.

110. The system of claim 93, wherein the coherent light source comprises a laser diode.

111. The system of claim 93, wherein the back-scattered light from the surface, passes through the at least one optical element to generate an image of the illumination spot that is less than or equal to a size of the photosensor array.

112. The system of claims 93, wherein the photosensor array comprises a plurality of photodiode pixels.

113. The system of claim 93, wherein an image data point comprises a digital value representative of a pixel on the photosensor array.

114. An optical detection system to identify displacement, the system comprising:

- a coherent light source configured to generate an illumination spot on a surface, the illumination spot providing optically back-scattered light off the surface;
- at least one photosensitive array, each photosensor array having pixels;
- at least one optical element, each optical element associated with a photosensitive array, each optical element configured to pass an image of the illumination spot onto its associated photosensor array to generate at least one image data signal from in response to the image on the pixels of the associated photosensor array, each image data signal comprising at least one image data points;
- a first storage area configured to store a first image data signal;
- a second storage area configured to store a second image data signal; and
- a comparison module configured to measure a similarity of images through the first image data signal and the second image data signal to obtain a displacement value, each image data signal comprising at least one image data points, the comparison module applying a cross-correlation function to a multiple of a shift value on a first randomly patterned image data signal being shifted by a predetermined shift value from a second randomly patterned image data signal.

* * * * *

UNITED STATES PATENT AND TRADEMARK OFFICE
CERTIFICATE OF CORRECTION

PATENT NO. : 6,927,758 B1  
DATED : August 9, 2005  
INVENTOR(S) : Julien Piot, Urban G. Schnell and Philippe J. Nussbaum It is certified that error appears in the above-identified patent and that said Letters Patent is hereby corrected as shown below:

Column 28,  
Lines 11, 14, 37, 40, 49, 53, 56, 59, 61 and 63, delete "93" and insert -- 114 --.

Column 29,  
Lines 1, 3, 7 and 9, delete "93" and insert -- 114 --.

Signed and Sealed this

Fourth Day of April, 2006

JON W. DUDAS  
*Director of the United States Patent and Trademark Office*